US 009775123 B2

(12) United States Patent
Harel

(10) Patent No.: US 9,775,123 B2
(45) Date of Patent: *Sep. 26, 2017

(54) INDIVIDUALIZED GAIN CONTROL OF UPLINK PATHS IN REMOTE UNITS IN A DISTRIBUTED ANTENNA SYSTEM (DAS) BASED ON INDIVIDUAL REMOTE UNIT CONTRIBUTION TO COMBINED UPLINK POWER

(71) Applicant: CORNING OPTICAL COMMUNICATIONS WIRELESS LTD, Airport City (IL)

(72) Inventor: Dror Harel, Hod Hasharon (IL)

(73) Assignee: Corning Optical Communications Wireless Ltd., Airport City (IL)

( * ) Notice: Subject to any disclaimer, the term of this patent is extended or adjusted under 35 U.S.C. 154(b) by 287 days.

This patent is subject to a terminal disclaimer.

(21) Appl. No.: 14/667,845

(22) Filed: Mar. 25, 2015

(65) Prior Publication Data

US 2015/0282105 A1 Oct. 1, 2015

Related U.S. Application Data

(60) Provisional application No. 61/971,770, filed on Mar. 28, 2014.

(51) Int. Cl.
*H04W 52/42* (2009.01)
*H04W 52/52* (2009.01)
(Continued)

(52) U.S. Cl.
CPC ............ *H04W 52/42* (2013.01); *H04B 7/024* (2013.01); *H04B 17/20* (2015.01); *H04W 52/52* (2013.01)

(58) Field of Classification Search
CPC .. H04B 10/2942; H04B 10/6931; H03G 3/20; H03G 2201/50; H03G 2201/70; H04W 52/00; H04W 52/52; H04W 52/386
See application file for complete search history.

(56) References Cited

U.S. PATENT DOCUMENTS 4,365,865 A 12/1982 Stiles
4,449,246 A 5/1984 Seiler et al.
(Continued)

FOREIGN PATENT DOCUMENTS

AU 645192 B 10/1992
AU 731180 B2 3/1998
(Continued)

OTHER PUBLICATIONS

Arredondo, Albedo et al., "Techniques for Improving In-Building Radio Coverage Using Fiber-Fed Distributed Antenna Networks," IEEE 46th Vehicular Technology Conference, Atlanta, Georgia, Apr. 28-May 1, 1996, pp. 1540-1543, vol. 3.
(Continued)

*Primary Examiner* — Benjamin H Elliott, IV
(74) *Attorney, Agent, or Firm* — C. Keith Montgomery

(57) ABSTRACT

Individualized gain control of uplink paths in remote units in a distributed antenna system (DAS) based on individual remote unit contribution to combined uplink power is disclosed. The gain level is reduced for uplink paths of individual remote units that provide higher power contribution to the combined uplink power of a combined uplink communications signal received in the central unit. This allows the initial uplink gain of all remote units to be set higher to increase sensitivity, because the gain of the remote units that provide higher power contributions to the combined uplink power in the central unit can be reduced if the combined uplink power exceeds the desired threshold power level. The gain of the remote units that provide higher power contri- (Continued)

butions to the combined uplink power in the central unit can be reduced without reducing the gain in the other remote units that would otherwise reduce their sensitivity.

20 Claims, 7 Drawing Sheets

(51) Int. Cl.
  *H04B 17/20* (2015.01)
  *H04B 7/024* (2017.01)

(56) References Cited

U.S. PATENT DOCUMENTS

| | | | |
|---|---|---|---|
| 4,573,212 A | 2/1986 | Lipsky |
| 4,665,560 A | 5/1987 | Lange |
| 4,867,527 A | 9/1989 | Dotti et al. |
| 4,889,977 A | 12/1989 | Haydon |
| 4,896,939 A | 1/1990 | O'Brien |
| 4,916,460 A | 4/1990 | Powell |
| 4,939,852 A | 7/1990 | Brenner |
| 4,972,346 A | 11/1990 | Kawano et al. |
| 5,039,195 A | 8/1991 | Jenkins et al. |
| 5,042,086 A | 8/1991 | Cole et al. |
| 5,056,109 A | 10/1991 | Gilhousen et al. |
| 5,059,927 A | 10/1991 | Cohen |
| 5,125,060 A | 6/1992 | Edmundson |
| 5,187,803 A | 2/1993 | Sohner et al. |
| 5,189,718 A | 2/1993 | Barrett et al. |
| 5,189,719 A | 2/1993 | Coleman et al. |
| 5,206,655 A | 4/1993 | Caille et al. |
| 5,208,812 A | 5/1993 | Dudek et al. |
| 5,210,812 A | 5/1993 | Nilsson et al. |
| 5,260,957 A | 11/1993 | Hakimi |
| 5,263,108 A | 11/1993 | Kurokawa et al. |
| 5,267,122 A | 11/1993 | Glover et al. |
| 5,268,971 A | 12/1993 | Nilsson et al. |
| 5,278,690 A | 1/1994 | Vella-Coleiro |
| 5,278,989 A | 1/1994 | Burke et al. |
| 5,280,472 A | 1/1994 | Gilhousen et al. |
| 5,299,947 A | 4/1994 | Barnard |
| 5,301,056 A | 4/1994 | O'Neill |
| 5,325,223 A | 6/1994 | Bears |
| 5,339,058 A | 8/1994 | Lique |
| 5,339,184 A | 8/1994 | Tang |
| 5,343,320 A | 8/1994 | Anderson |
| 5,377,035 A | 12/1994 | Wang et al. |
| 5,379,455 A | 1/1995 | Koschek |
| 5,381,459 A | 1/1995 | Lappington |
| 5,396,224 A | 3/1995 | Dukes et al. |
| 5,400,391 A | 3/1995 | Emura et al. |
| 5,420,863 A | 5/1995 | Taketsugu et al. |
| 5,424,864 A | 6/1995 | Emura |
| 5,444,564 A | 8/1995 | Newberg |
| 5,457,557 A | 10/1995 | Zarem et al. |
| 5,459,727 A | 10/1995 | Vannucci |
| 5,469,523 A | 11/1995 | Blew et al. |
| 5,519,830 A | 5/1996 | Opoczynski |
| 5,543,000 A | 8/1996 | Lique |
| 5,546,443 A | 8/1996 | Raith |
| 5,557,698 A | 9/1996 | Gareis et al. |
| 5,574,815 A | 11/1996 | Kneeland |
| 5,598,288 A | 1/1997 | Collar |
| 5,606,725 A | 2/1997 | Hart |
| 5,615,034 A | 3/1997 | Hori |
| 5,627,879 A | 5/1997 | Russell et al. |
| 5,640,678 A | 6/1997 | Ishikawa et al. |
| 5,642,405 A | 6/1997 | Fischer et al. |
| 5,644,622 A | 7/1997 | Russell et al. |
| 5,648,961 A | 7/1997 | Ebihara |
| 5,651,081 A | 7/1997 | Blew et al. |
| 5,657,374 A | 8/1997 | Russell et al. |
| 5,668,562 A | 9/1997 | Cutrer et al. |
| 5,677,974 A | 10/1997 | Elms et al. |
| 5,682,256 A | 10/1997 | Motley et al. |
| 5,694,232 A | 12/1997 | Parsay et al. |
| 5,703,602 A | 12/1997 | Casebolt |
| 5,708,681 A | 1/1998 | Malkemes et al. |
| 5,726,984 A | 3/1998 | Kubler et al. |
| 5,765,099 A | 6/1998 | Georges et al. |
| 5,774,789 A | 6/1998 | van der Kaay et al. |
| 5,790,536 A | 8/1998 | Mahany et al. |
| 5,790,606 A | 8/1998 | Dent |
| 5,793,772 A | 8/1998 | Burke et al. |
| 5,802,173 A | 9/1998 | Hamilton-Piercy et al. |
| 5,802,473 A | 9/1998 | Rutledge et al. |
| 5,805,975 A | 9/1998 | Green, Sr. et al. |
| 5,805,983 A | 9/1998 | Naidu et al. |
| 5,809,395 A | 9/1998 | Hamilton-Piercy et al. |
| 5,809,422 A | 9/1998 | Raleigh et al. |
| 5,809,431 A | 9/1998 | Bustamante et al. |
| 5,812,296 A | 9/1998 | Tarusawa et al. |
| 5,818,619 A | 10/1998 | Medved et al. |
| 5,818,883 A | 10/1998 | Smith et al. |
| 5,821,510 A | 10/1998 | Cohen et al. |
| 5,825,651 A | 10/1998 | Gupta et al. |
| 5,838,474 A | 11/1998 | Stilling |
| 5,839,052 A | 11/1998 | Dean et al. |
| 5,852,651 A | 12/1998 | Fischer et al. |
| 5,854,986 A | 12/1998 | Dorren et al. |
| 5,859,719 A | 1/1999 | Dentai et al. |
| 5,862,460 A | 1/1999 | Rich |
| 5,867,485 A | 2/1999 | Chambers et al. |
| 5,867,763 A | 2/1999 | Dean et al. |
| 5,881,200 A | 3/1999 | Burt |
| 5,883,882 A | 3/1999 | Schwartz |
| 5,896,568 A | 4/1999 | Tseng et al. |
| 5,903,834 A | 5/1999 | Wallstedt et al. |
| 5,910,776 A | 6/1999 | Black |
| 5,913,003 A | 6/1999 | Arroyo et al. |
| 5,917,636 A | 6/1999 | Wake et al. |
| 5,930,682 A | 7/1999 | Schwartz et al. |
| 5,936,754 A | 8/1999 | Ariyavisitakul et al. |
| 5,943,372 A | 8/1999 | Gans et al. |
| 5,946,622 A | 8/1999 | Bojeryd |
| 5,949,564 A | 9/1999 | Wake |
| 5,953,670 A | 9/1999 | Newson |
| 5,959,531 A | 9/1999 | Gallagher, III et al. |
| 5,960,344 A | 9/1999 | Mahany |
| 5,969,837 A | 10/1999 | Farber et al. |
| 5,983,070 A | 11/1999 | Georges et al. |
| 5,987,303 A | 11/1999 | Dutta et al. |
| 6,005,884 A | 12/1999 | Cook et al. |
| 6,006,069 A | 12/1999 | Langston et al. |
| 6,006,105 A | 12/1999 | Rostoker et al. |
| 6,011,980 A | 1/2000 | Nagano et al. |
| 6,014,546 A | 1/2000 | Georges et al. |
| 6,016,426 A | 1/2000 | Bodell |
| 6,023,625 A | 2/2000 | Myers, Jr. |
| 6,037,898 A | 3/2000 | Parish et al. |
| 6,061,161 A | 5/2000 | Yang et al. |
| 6,069,721 A | 5/2000 | Oh et al. |
| 6,088,381 A | 7/2000 | Myers, Jr. |
| 6,112,086 A | 8/2000 | Wala |
| 6,118,767 A | 9/2000 | Shen et al. |
| 6,122,529 A | 9/2000 | Sabat, Jr. et al. |
| 6,127,917 A | 10/2000 | Tuttle |
| 6,128,470 A | 10/2000 | Naidu et al. |
| 6,128,477 A | 10/2000 | Freed |
| 6,148,041 A | 11/2000 | Dent |
| 6,150,921 A | 11/2000 | Werb et al. |
| 6,157,810 A | 12/2000 | Georges et al. |
| 6,192,216 B1 | 2/2001 | Sabat, Jr. et al. |
| 6,194,968 B1 | 2/2001 | Winslow |
| 6,212,397 B1 | 4/2001 | Langston et al. |
| 6,222,503 B1 | 4/2001 | Gietema |
| 6,223,201 B1 | 4/2001 | Reznak |
| 6,226,281 B1 | 5/2001 | Cordier et al. |
| 6,232,870 B1 | 5/2001 | Garber et al. |
| 6,236,789 B1 | 5/2001 | Fitz |
| 6,236,863 B1 | 5/2001 | Waldroup et al. |
| 6,240,274 B1 | 5/2001 | Izadpanah |
| 6,246,500 B1 | 6/2001 | Ackerman |
| 6,268,946 B1 | 7/2001 | Larkin et al. |

(56) References Cited

U.S. PATENT DOCUMENTS

| | | |
|---|---|---|
| 6,275,990 B1 | 8/2001 | Dapper et al. |
| 6,279,158 B1 | 8/2001 | Geile et al. |
| 6,286,163 B1 | 9/2001 | Trimble |
| 6,292,673 B1 | 9/2001 | Maeda et al. |
| 6,295,451 B1 | 9/2001 | Mimura |
| 6,301,240 B1 | 10/2001 | Slabinski et al. |
| 6,307,869 B1 | 10/2001 | Pawelski |
| 6,314,163 B1 | 11/2001 | Acampora |
| 6,317,599 B1 | 11/2001 | Rappaport et al. |
| 6,323,980 B1 | 11/2001 | Bloom |
| 6,324,391 B1 | 11/2001 | Bodell |
| 6,330,241 B1 | 12/2001 | Fort |
| 6,330,244 B1 | 12/2001 | Swartz et al. |
| 6,334,219 B1 | 12/2001 | Hill et al. |
| 6,336,021 B1 | 1/2002 | Nukada |
| 6,336,042 B1 | 1/2002 | Dawson et al. |
| 6,337,754 B1 | 1/2002 | Imajo |
| 6,340,932 B1 | 1/2002 | Rodgers et al. |
| 6,353,406 B1 | 3/2002 | Lanzl et al. |
| 6,353,600 B1 | 3/2002 | Schwartz et al. |
| 6,359,714 B1 | 3/2002 | Imajo |
| 6,370,203 B1 | 4/2002 | Boesch et al. |
| 6,374,078 B1 | 4/2002 | Williams et al. |
| 6,374,124 B1 | 4/2002 | Slabinski |
| 6,389,010 B1 | 5/2002 | Kubler et al. |
| 6,400,318 B1 | 6/2002 | Kasami et al. |
| 6,400,418 B1 | 6/2002 | Wakabayashi |
| 6,404,775 B1 | 6/2002 | Leslie et al. |
| 6,405,018 B1 | 6/2002 | Reudink et al. |
| 6,405,058 B2 | 6/2002 | Bobier |
| 6,405,308 B1 | 6/2002 | Gupta et al. |
| 6,414,624 B2 | 7/2002 | Endo et al. |
| 6,415,132 B1 | 7/2002 | Sabat, Jr. |
| 6,421,327 B1 | 7/2002 | Lundby et al. |
| 6,438,301 B1 | 8/2002 | Johnson et al. |
| 6,438,371 B1 | 8/2002 | Fujise et al. |
| 6,448,558 B1 | 9/2002 | Greene |
| 6,452,915 B1 | 9/2002 | Jorgensen |
| 6,459,519 B1 | 10/2002 | Sasai et al. |
| 6,459,989 B1 | 10/2002 | Kirkpatrick et al. |
| 6,477,154 B1 | 11/2002 | Cheong et al. |
| 6,480,702 B1 | 11/2002 | Sabat, Jr. |
| 6,486,907 B1 | 11/2002 | Farber et al. |
| 6,496,290 B1 | 12/2002 | Lee |
| 6,501,965 B1 | 12/2002 | Lucidarme |
| 6,504,636 B1 | 1/2003 | Seto et al. |
| 6,504,831 B1 | 1/2003 | Greenwood et al. |
| 6,512,478 B1 | 1/2003 | Chien |
| 6,519,395 B1 | 2/2003 | Bevan et al. |
| 6,519,449 B1 | 2/2003 | Zhang et al. |
| 6,525,855 B1 | 2/2003 | Westbrook et al. |
| 6,535,330 B1 | 3/2003 | Lelic et al. |
| 6,535,720 B1 | 3/2003 | Kintis et al. |
| 6,556,551 B1 | 4/2003 | Schwartz |
| 6,577,794 B1 | 6/2003 | Currie et al. |
| 6,577,801 B2 | 6/2003 | Broderick et al. |
| 6,580,402 B2 | 6/2003 | Navarro et al. |
| 6,580,905 B1 | 6/2003 | Naidu et al. |
| 6,580,918 B1 | 6/2003 | Leickel et al. |
| 6,583,763 B2 | 6/2003 | Judd |
| 6,587,514 B1 | 7/2003 | Wright et al. |
| 6,594,496 B2 | 7/2003 | Schwartz |
| 6,597,325 B2 | 7/2003 | Judd et al. |
| 6,598,009 B2 | 7/2003 | Yang |
| 6,606,430 B2 | 8/2003 | Bartur et al. |
| 6,615,074 B2 | 9/2003 | Mickle et al. |
| 6,628,732 B1 | 9/2003 | Takaki |
| 6,634,811 B1 | 10/2003 | Gertel et al. |
| 6,636,747 B2 | 10/2003 | Harada et al. |
| 6,640,103 B1 | 10/2003 | Inman et al. |
| 6,643,437 B1 | 11/2003 | Park |
| 6,652,158 B2 | 11/2003 | Bartur et al. |
| 6,654,590 B2 | 11/2003 | Boros et al. |
| 6,654,616 B1 | 11/2003 | Pope, Jr. et al. |
| 6,657,535 B1 | 12/2003 | Magbie et al. |
| 6,658,269 B1 | 12/2003 | Golemon et al. |
| 6,665,308 B1 | 12/2003 | Rakib et al. |
| 6,670,930 B2 | 12/2003 | Navarro |
| 6,674,966 B1 | 1/2004 | Koonen |
| 6,675,294 B1 | 1/2004 | Gupta et al. |
| 6,678,509 B2 | 1/2004 | Skarman et al. |
| 6,687,437 B1 | 2/2004 | Starnes et al. |
| 6,690,328 B2 | 2/2004 | Judd |
| 6,697,603 B1 | 2/2004 | Lovinggood et al. |
| 6,701,137 B1 | 3/2004 | Judd et al. |
| 6,704,298 B1 | 3/2004 | Matsumiya et al. |
| 6,704,545 B1 | 3/2004 | Wala |
| 6,710,366 B1 | 3/2004 | Lee et al. |
| 6,714,800 B2 | 3/2004 | Johnson et al. |
| 6,731,880 B2 | 5/2004 | Westbrook et al. |
| 6,745,013 B1 | 6/2004 | Porter et al. |
| 6,758,913 B1 | 7/2004 | Tunney et al. |
| 6,763,226 B1 | 7/2004 | McZeal, Jr. |
| 6,771,862 B2 | 8/2004 | Karnik et al. |
| 6,771,933 B1 | 8/2004 | Eng et al. |
| 6,784,802 B1 | 8/2004 | Stanescu |
| 6,785,558 B1 | 8/2004 | Stratford et al. |
| 6,788,666 B1 | 9/2004 | Linebarger et al. |
| 6,801,767 B1 | 10/2004 | Schwartz et al. |
| 6,807,374 B1 | 10/2004 | Imajo et al. |
| 6,812,824 B1 | 11/2004 | Goldinger et al. |
| 6,812,905 B2 | 11/2004 | Thomas et al. |
| 6,823,174 B1 | 11/2004 | Masenten et al. |
| 6,826,163 B2 | 11/2004 | Mani et al. |
| 6,826,164 B2 | 11/2004 | Mani et al. |
| 6,826,337 B2 | 11/2004 | Linnell |
| 6,836,660 B1 | 12/2004 | Wala |
| 6,836,673 B1 | 12/2004 | Trott |
| 6,842,433 B2 | 1/2005 | West et al. |
| 6,842,459 B1 | 1/2005 | Binder |
| 6,847,856 B1 | 1/2005 | Bohannon |
| 6,850,510 B2 | 2/2005 | Kubler |
| 6,865,390 B2 | 3/2005 | Goss et al. |
| 6,873,823 B2 | 3/2005 | Hasarchi |
| 6,876,056 B2 | 4/2005 | Tilmans et al. |
| 6,879,290 B1 | 4/2005 | Toutain et al. |
| 6,882,311 B2 | 4/2005 | Walker et al. |
| 6,883,710 B2 | 4/2005 | Chung |
| 6,885,344 B2 | 4/2005 | Mohamadi |
| 6,885,846 B1 | 4/2005 | Panasik et al. |
| 6,889,060 B2 | 5/2005 | Fernando et al. |
| 6,909,399 B1 | 6/2005 | Zegelin et al. |
| 6,915,058 B2 | 7/2005 | Pons |
| 6,915,529 B1 | 7/2005 | Suematsu et al. |
| 6,919,858 B2 | 7/2005 | Rofougaran |
| 6,920,330 B2 | 7/2005 | Caronni et al. |
| 6,924,997 B2 | 8/2005 | Chen et al. |
| 6,930,987 B1 | 8/2005 | Fukuda et al. |
| 6,931,183 B2 | 8/2005 | Panak et al. |
| 6,931,659 B1 | 8/2005 | Kinemura |
| 6,933,849 B2 | 8/2005 | Sawyer |
| 6,934,511 B1 | 8/2005 | Lovinggood et al. |
| 6,934,541 B2 | 8/2005 | Miyatani |
| 6,941,112 B2 | 9/2005 | Hasegawa |
| 6,946,989 B2 | 9/2005 | Vavik |
| 6,961,312 B2 | 11/2005 | Kubler et al. |
| 6,963,289 B2 | 11/2005 | Aljadeff et al. |
| 6,963,552 B2 | 11/2005 | Sabat, Jr. et al. |
| 6,965,718 B2 | 11/2005 | Koertel |
| 6,967,347 B2 | 11/2005 | Estes et al. |
| 6,968,107 B2 | 11/2005 | Belardi et al. |
| 6,970,652 B2 | 11/2005 | Zhang et al. |
| 6,973,243 B2 | 12/2005 | Koyasu et al. |
| 6,974,262 B1 | 12/2005 | Rickenbach |
| 6,977,502 B1 | 12/2005 | Hertz |
| 7,002,511 B1 | 2/2006 | Ammar et al. |
| 7,006,465 B2 | 2/2006 | Toshimitsu et al. |
| 7,013,087 B2 | 3/2006 | Suzuki et al. |
| 7,015,826 B1 | 3/2006 | Chan et al. |
| 7,020,473 B2 | 3/2006 | Splett |
| 7,020,488 B1 | 3/2006 | Bleile et al. |
| 7,024,166 B2 | 4/2006 | Wallace |
| 7,035,512 B2 | 4/2006 | Van Bijsterveld |
| 7,035,671 B2 | 4/2006 | Solum |

(56) References Cited

U.S. PATENT DOCUMENTS

| | | |
|---|---|---|
| 7,039,399 B2 | 5/2006 | Fischer |
| 7,043,271 B1 | 5/2006 | Seto et al. |
| 7,047,028 B2 | 5/2006 | Cagenius et al. |
| 7,050,017 B2 | 5/2006 | King et al. |
| 7,053,838 B2 | 5/2006 | Judd |
| 7,054,513 B2 | 5/2006 | Herz et al. |
| 7,069,577 B2 | 6/2006 | Geile et al. |
| 7,072,586 B2 | 7/2006 | Aburakawa et al. |
| 7,082,320 B2 | 7/2006 | Kattukaran et al. |
| 7,084,769 B2 | 8/2006 | Bauer et al. |
| 7,093,985 B2 | 8/2006 | Lord et al. |
| 7,103,119 B2 | 9/2006 | Matsuoka et al. |
| 7,103,377 B2 | 9/2006 | Bauman et al. |
| 7,106,252 B2 | 9/2006 | Smith et al. |
| 7,106,931 B2 | 9/2006 | Sutehall et al. |
| 7,110,795 B2 | 9/2006 | Doi |
| 7,114,859 B1 | 10/2006 | Tuohimaa et al. |
| 7,127,175 B2 | 10/2006 | Mani et al. |
| 7,127,176 B2 | 10/2006 | Sasaki |
| 7,142,503 B1 | 11/2006 | Grant et al. |
| 7,142,535 B2 | 11/2006 | Kubler et al. |
| 7,142,619 B2 | 11/2006 | Sommer et al. |
| 7,146,506 B1 | 12/2006 | Hannah et al. |
| 7,160,032 B2 | 1/2007 | Nagashima et al. |
| 7,171,244 B2 | 1/2007 | Bauman |
| 7,184,728 B2 | 2/2007 | Solum |
| 7,190,748 B2 | 3/2007 | Kim et al. |
| 7,194,023 B2 | 3/2007 | Norrell et al. |
| 7,199,443 B2 | 4/2007 | Elsharawy |
| 7,200,305 B2 | 4/2007 | Dion et al. |
| 7,200,391 B2 | 4/2007 | Chung et al. |
| 7,228,072 B2 | 6/2007 | Mickelsson et al. |
| 7,263,293 B2 | 8/2007 | Ommodt et al. |
| 7,269,311 B2 | 9/2007 | Kim et al. |
| 7,280,011 B2 | 10/2007 | Bayar et al. |
| 7,286,843 B2 | 10/2007 | Scheck |
| 7,286,854 B2 | 10/2007 | Ferrato et al. |
| 7,295,119 B2 | 11/2007 | Rappaport et al. |
| 7,310,430 B1 | 12/2007 | Mallya et al. |
| 7,313,415 B2 | 12/2007 | Wake et al. |
| 7,315,735 B2 | 1/2008 | Graham |
| 7,324,730 B2 | 1/2008 | Varkey et al. |
| 7,343,164 B2 | 3/2008 | Kallstenius |
| 7,348,843 B1 | 3/2008 | Qiu et al. |
| 7,349,633 B2 | 3/2008 | Lee et al. |
| 7,359,408 B2 | 4/2008 | Kim |
| 7,359,674 B2 | 4/2008 | Markki et al. |
| 7,366,150 B2 | 4/2008 | Lee et al. |
| 7,366,151 B2 | 4/2008 | Kubler et al. |
| 7,369,526 B2 | 5/2008 | Lechleider et al. |
| 7,379,669 B2 | 5/2008 | Kim |
| 7,388,892 B2 | 6/2008 | Nishiyama et al. |
| 7,392,025 B2 | 6/2008 | Rooyen et al. |
| 7,392,029 B2 | 6/2008 | Pronkine |
| 7,394,883 B2 | 7/2008 | Funakubo et al. |
| 7,403,156 B2 | 7/2008 | Coppi et al. |
| 7,409,159 B2 | 8/2008 | Izadpanah |
| 7,412,224 B2 | 8/2008 | Kotola et al. |
| 7,424,228 B1 | 9/2008 | Williams et al. |
| 7,442,679 B2 | 10/2008 | Stolte et al. |
| 7,444,051 B2 | 10/2008 | Tatat et al. |
| 7,450,853 B2 | 11/2008 | Kim et al. |
| 7,450,854 B2 | 11/2008 | Lee et al. |
| 7,451,365 B2 | 11/2008 | Wang et al. |
| 7,454,222 B2 | 11/2008 | Huang et al. |
| 7,460,507 B2 | 12/2008 | Kubler et al. |
| 7,460,829 B2 | 12/2008 | Utsumi et al. |
| 7,460,831 B2 | 12/2008 | Hasarchi |
| 7,466,925 B2 | 12/2008 | Iannelli |
| 7,469,105 B2 | 12/2008 | Wake et al. |
| 7,477,597 B2 | 1/2009 | Segel |
| 7,483,504 B2 | 1/2009 | Shapira et al. |
| 7,483,711 B2 | 1/2009 | Burchfiel |
| 7,496,070 B2 | 2/2009 | Vesuna |
| 7,496,384 B2 | 2/2009 | Seto et al. |
| 7,505,747 B2 | 3/2009 | Solum |
| 7,512,419 B2 | 3/2009 | Solum |
| 7,522,552 B2 | 4/2009 | Fein et al. |
| 7,539,509 B2 | 5/2009 | Bauman et al. |
| 7,542,452 B2 | 6/2009 | Penumetsa |
| 7,546,138 B2 | 6/2009 | Bauman |
| 7,548,138 B2 | 6/2009 | Kamgaing |
| 7,548,695 B2 | 6/2009 | Wake |
| 7,551,641 B2 | 6/2009 | Pirzada et al. |
| 7,557,758 B2 | 7/2009 | Rofougaran |
| 7,580,384 B2 | 8/2009 | Kubler et al. |
| 7,586,861 B2 | 9/2009 | Kubler et al. |
| 7,590,354 B2 | 9/2009 | Sauer et al. |
| 7,593,704 B2 | 9/2009 | Pinel et al. |
| 7,599,420 B2 | 10/2009 | Forenza et al. |
| 7,599,672 B2 | 10/2009 | Shoji et al. |
| 7,610,046 B2 | 10/2009 | Wala |
| 7,630,690 B2 | 12/2009 | Kaewell, Jr. et al. |
| 7,633,934 B2 | 12/2009 | Kubler et al. |
| 7,639,982 B2 | 12/2009 | Wala |
| 7,646,743 B2 | 1/2010 | Kubler et al. |
| 7,646,777 B2 | 1/2010 | Hicks, III et al. |
| 7,653,397 B2 | 1/2010 | Pernu et al. |
| 7,668,565 B2 | 2/2010 | Ylänen et al. |
| 7,675,936 B2 | 3/2010 | Mizutani et al. |
| 7,688,811 B2 | 3/2010 | Kubler et al. |
| 7,693,486 B2 | 4/2010 | Kasslin et al. |
| 7,697,467 B2 | 4/2010 | Kubler et al. |
| 7,697,574 B2 | 4/2010 | Suematsu et al. |
| 7,715,375 B2 | 5/2010 | Kubler et al. |
| 7,720,510 B2 | 5/2010 | Pescod et al. |
| 7,751,374 B2 | 7/2010 | Donovan |
| 7,751,838 B2 | 7/2010 | Ramesh et al. |
| 7,760,703 B2 | 7/2010 | Kubler et al. |
| 7,761,093 B2 | 7/2010 | Sabat, Jr. et al. |
| 7,768,951 B2 | 8/2010 | Kubler et al. |
| 7,773,573 B2 | 8/2010 | Chung et al. |
| 7,778,603 B2 | 8/2010 | Palin et al. |
| 7,787,823 B2 | 8/2010 | George et al. |
| 7,787,854 B2 | 8/2010 | Conyers et al. |
| 7,805,073 B2 | 9/2010 | Sabat, Jr. et al. |
| 7,809,012 B2 | 10/2010 | Ruuska et al. |
| 7,812,766 B2 | 10/2010 | Leblanc et al. |
| 7,812,775 B2 | 10/2010 | Babakhani et al. |
| 7,817,958 B2 | 10/2010 | Scheinert et al. |
| 7,817,969 B2 | 10/2010 | Castaneda et al. |
| 7,835,328 B2 | 11/2010 | Stephens et al. |
| 7,844,273 B2 | 11/2010 | Scheinert |
| 7,848,316 B2 | 12/2010 | Kubler et al. |
| 7,848,731 B1 | 12/2010 | Dianda et al. |
| 7,848,770 B2 | 12/2010 | Scheinert |
| 7,853,234 B2 | 12/2010 | Afsahi |
| 7,870,321 B2 | 1/2011 | Rofougaran |
| 7,880,677 B2 | 2/2011 | Rofougaran et al. |
| 7,881,755 B1 | 2/2011 | Mishra et al. |
| 7,894,423 B2 | 2/2011 | Kubler et al. |
| 7,899,007 B2 | 3/2011 | Kubler et al. |
| 7,907,972 B2 | 3/2011 | Walton et al. |
| 7,912,043 B2 | 3/2011 | Kubler et al. |
| 7,912,506 B2 | 3/2011 | Lovberg et al. |
| 7,916,706 B2 | 3/2011 | Kubler et al. |
| 7,917,177 B2 | 3/2011 | Bauman |
| 7,920,553 B2 | 4/2011 | Kubler et al. |
| 7,920,858 B2 | 4/2011 | Sabat, Jr. et al. |
| 7,924,783 B1 | 4/2011 | Mahany et al. |
| 7,929,940 B1 | 4/2011 | Dianda et al. |
| 7,936,713 B2 | 5/2011 | Kubler et al. |
| 7,948,897 B2 | 5/2011 | Stuart et al. |
| 7,949,364 B2 | 5/2011 | Kasslin et al. |
| 7,957,777 B1 | 6/2011 | Vu et al. |
| 7,962,111 B2 | 6/2011 | Solum |
| 7,969,009 B2 | 6/2011 | Chandrasekaran |
| 7,969,911 B2 | 6/2011 | Mahany et al. |
| 7,990,925 B2 | 8/2011 | Tinnakornsrisuphap et al. |
| 7,996,020 B1 | 8/2011 | Chhabra |
| 8,018,907 B2 | 9/2011 | Kubler et al. |
| 8,023,886 B2 | 9/2011 | Rofougaran |
| 8,027,656 B2 | 9/2011 | Rofougaran et al. |
| 8,036,308 B2 | 10/2011 | Rofougaran |

(56) References Cited

U.S. PATENT DOCUMENTS

| | | | |
|---|---|---|---|
| 8,082,353 B2 | 12/2011 | Huber et al. | |
| 8,086,192 B2 | 12/2011 | Rofougaran et al. | |
| 8,107,464 B2 | 1/2012 | Schmidt et al. | |
| 8,135,102 B2 | 3/2012 | Wiwel et al. | |
| 8,174,428 B2 | 5/2012 | Wegener | |
| 8,213,401 B2 | 7/2012 | Fischer et al. | |
| 8,223,795 B2 | 7/2012 | Cox et al. | |
| 8,238,463 B1 | 8/2012 | Arslan et al. | |
| 8,270,387 B2 | 9/2012 | Cannon et al. | |
| 8,274,929 B2 | 9/2012 | Schmidt et al. | |
| 8,279,800 B2 | 10/2012 | Schmidt et al. | |
| 8,290,483 B2 | 10/2012 | Sabat, Jr. et al. | |
| 8,306,563 B2 | 11/2012 | Zavadsky et al. | |
| 8,346,091 B2 | 1/2013 | Kummetz et al. | |
| 8,346,278 B2 | 1/2013 | Wala et al. | |
| 8,422,884 B2 | 4/2013 | Mao | |
| 8,428,201 B1 | 4/2013 | McHann, Jr. et al. | 375/345 |
| 8,428,510 B2 | 4/2013 | Stratford et al. | 455/7 |
| 8,462,683 B2 | 6/2013 | Uyehara et al. | |
| 8,467,823 B2 | 6/2013 | Seki et al. | |
| 8,472,579 B2 | 6/2013 | Uyehara et al. | |
| 8,509,215 B2 | 8/2013 | Stuart | |
| 8,509,850 B2 | 8/2013 | Zavadsky et al. | 455/562.1 |
| 8,526,970 B2 | 9/2013 | Wala et al. | |
| 8,532,242 B2 | 9/2013 | Fischer et al. | 375/356 |
| 8,548,526 B2 | 10/2013 | Schmidt et al. | |
| 8,583,100 B2 | 11/2013 | Koziy et al. | |
| 8,626,245 B2 | 1/2014 | Zavadsky et al. | |
| 8,634,766 B2 | 1/2014 | Hobbs et al. | |
| 8,681,917 B2 | 3/2014 | McAllister et al. | |
| 8,693,342 B2 | 4/2014 | Uyehara et al. | |
| 8,694,034 B2 | 4/2014 | Notargiacomo | |
| 8,699,982 B2 | 4/2014 | Singh | |
| 8,737,300 B2 | 5/2014 | Stapleton et al. | |
| 8,737,454 B2 | 5/2014 | Wala et al. | |
| 8,743,718 B2 | 6/2014 | Grenier et al. | |
| 8,743,756 B2 | 6/2014 | Uyehara et al. | |
| 8,792,933 B2 | 7/2014 | Chen | |
| 8,837,659 B2 | 9/2014 | Uyehara et al. | |
| 8,837,940 B2 | 9/2014 | Smith et al. | |
| 8,873,585 B2 | 10/2014 | Oren et al. | |
| 8,908,607 B2 | 12/2014 | Kummetz et al. | |
| 8,929,288 B2 | 1/2015 | Stewart et al. | |
| 8,948,816 B2 | 2/2015 | Fischer et al. | |
| 8,958,789 B2 | 2/2015 | Bauman et al. | |
| 8,976,067 B2 | 3/2015 | Fischer | |
| 9,001,811 B2 | 4/2015 | Wala et al. | |
| 9,420,542 B2 * | 8/2016 | Henia | H04B 10/25753 |
| 2001/0036163 A1 | 11/2001 | Sabat, Jr. et al. | |
| 2001/0036199 A1 | 11/2001 | Terry | |
| 2002/0003645 A1 | 1/2002 | Kim et al. | |
| 2002/0009070 A1 | 1/2002 | Lindsay et al. | |
| 2002/0012336 A1 | 1/2002 | Hughes et al. | |
| 2002/0012495 A1 | 1/2002 | Sasai et al. | |
| 2002/0016827 A1 | 2/2002 | McCabe et al. | |
| 2002/0045519 A1 | 4/2002 | Watterson et al. | |
| 2002/0048071 A1 | 4/2002 | Suzuki et al. | |
| 2002/0051434 A1 | 5/2002 | Ozluturk et al. | |
| 2002/0075906 A1 | 6/2002 | Cole et al. | |
| 2002/0092347 A1 | 7/2002 | Niekerk et al. | |
| 2002/0097564 A1 | 7/2002 | Struhsaker et al. | |
| 2002/0103012 A1 | 8/2002 | Kim et al. | |
| 2002/0111149 A1 | 8/2002 | Shoki | |
| 2002/0111192 A1 | 8/2002 | Thomas et al. | |
| 2002/0114038 A1 | 8/2002 | Arnon et al. | |
| 2002/0123365 A1 | 9/2002 | Thorson et al. | |
| 2002/0126967 A1 | 9/2002 | Panak et al. | |
| 2002/0128009 A1 | 9/2002 | Boch et al. | |
| 2002/0130778 A1 | 9/2002 | Nicholson | |
| 2002/0181668 A1 | 12/2002 | Masoian et al. | |
| 2002/0190845 A1 | 12/2002 | Moore | |
| 2002/0197984 A1 | 12/2002 | Monin et al. | |
| 2003/0002604 A1 | 1/2003 | Fifield et al. | |
| 2003/0007214 A1 | 1/2003 | Aburakawa et al. | |
| 2003/0016418 A1 | 1/2003 | Westbrook et al. | |
| 2003/0045284 A1 | 3/2003 | Copley et al. | |
| 2003/0069922 A1 | 4/2003 | Arunachalam | |
| 2003/0078074 A1 | 4/2003 | Sesay et al. | |
| 2003/0112826 A1 | 6/2003 | Ashwood Smith et al. | |
| 2003/0141962 A1 | 7/2003 | Barink | |
| 2003/0161637 A1 | 8/2003 | Yamamoto et al. | |
| 2003/0162516 A1 | 8/2003 | Solum | |
| 2003/0165287 A1 | 9/2003 | Krill et al. | |
| 2003/0174099 A1 | 9/2003 | Bauer et al. | |
| 2003/0209601 A1 | 11/2003 | Chung | |
| 2004/0001719 A1 | 1/2004 | Sasaki | |
| 2004/0008114 A1 | 1/2004 | Sawyer | |
| 2004/0017785 A1 | 1/2004 | Zelst | |
| 2004/0037565 A1 | 2/2004 | Young et al. | |
| 2004/0041714 A1 | 3/2004 | Forster | |
| 2004/0043764 A1 | 3/2004 | Bigham et al. | |
| 2004/0047313 A1 | 3/2004 | Rumpf et al. | |
| 2004/0078151 A1 | 4/2004 | Aljadeff et al. | |
| 2004/0095907 A1 | 5/2004 | Agee et al. | |
| 2004/0100930 A1 | 5/2004 | Shapira et al. | |
| 2004/0105435 A1 | 6/2004 | Morioka | |
| 2004/0106387 A1 | 6/2004 | Bauman et al. | |
| 2004/0106435 A1 | 6/2004 | Bauman et al. | |
| 2004/0126068 A1 | 7/2004 | Van Bijsterveld | |
| 2004/0126107 A1 | 7/2004 | Jay et al. | |
| 2004/0139477 A1 | 7/2004 | Russell et al. | |
| 2004/0146020 A1 | 7/2004 | Kubler et al. | |
| 2004/0149736 A1 | 8/2004 | Clothier | |
| 2004/0151164 A1 | 8/2004 | Kubler et al. | |
| 2004/0151503 A1 | 8/2004 | Kashima et al. | |
| 2004/0157623 A1 | 8/2004 | Splett | |
| 2004/0160912 A1 | 8/2004 | Kubler et al. | |
| 2004/0160913 A1 | 8/2004 | Kubler et al. | |
| 2004/0162084 A1 | 8/2004 | Wang | |
| 2004/0162115 A1 | 8/2004 | Smith et al. | |
| 2004/0162116 A1 | 8/2004 | Han et al. | |
| 2004/0165573 A1 | 8/2004 | Kubler et al. | |
| 2004/0175173 A1 | 9/2004 | Deas | |
| 2004/0196404 A1 | 10/2004 | Loheit et al. | |
| 2004/0202257 A1 | 10/2004 | Mehta et al. | |
| 2004/0203703 A1 | 10/2004 | Fischer | |
| 2004/0203704 A1 | 10/2004 | Ommodt et al. | |
| 2004/0203846 A1 | 10/2004 | Caronni et al. | |
| 2004/0204109 A1 | 10/2004 | Hoppenstein | |
| 2004/0208526 A1 | 10/2004 | Mibu | |
| 2004/0208643 A1 | 10/2004 | Roberts et al. | |
| 2004/0215723 A1 | 10/2004 | Chadha | |
| 2004/0218873 A1 | 11/2004 | Nagashima et al. | |
| 2004/0233877 A1 | 11/2004 | Lee et al. | |
| 2004/0258105 A1 | 12/2004 | Spathas et al. | |
| 2004/0267971 A1 | 12/2004 | Seshadri | |
| 2005/0052287 A1 | 3/2005 | Whitesmith et al. | |
| 2005/0058451 A1 | 3/2005 | Ross | |
| 2005/0068179 A1 | 3/2005 | Roesner | |
| 2005/0076982 A1 | 4/2005 | Metcalf et al. | |
| 2005/0078006 A1 | 4/2005 | Hutchins et al. | |
| 2005/0093679 A1 | 5/2005 | Zai et al. | |
| 2005/0099343 A1 | 5/2005 | Asrani et al. | |
| 2005/0116821 A1 | 6/2005 | Wilsey et al. | |
| 2005/0123232 A1 | 6/2005 | Piede et al. | |
| 2005/0141545 A1 | 6/2005 | Fein et al. | |
| 2005/0143077 A1 | 6/2005 | Charbonneau | |
| 2005/0147067 A1 | 7/2005 | Mani et al. | |
| 2005/0147071 A1 | 7/2005 | Karaoguz et al. | |
| 2005/0148306 A1 | 7/2005 | Hiddink | |
| 2005/0159108 A1 | 7/2005 | Fletcher | |
| 2005/0174236 A1 | 8/2005 | Brookner | |
| 2005/0176458 A1 | 8/2005 | Shklarsky et al. | |
| 2005/0201323 A1 | 9/2005 | Mani et al. | |
| 2005/0201761 A1 | 9/2005 | Bartur et al. | |
| 2005/0219050 A1 | 10/2005 | Martin | |
| 2005/0224585 A1 | 10/2005 | Durrant et al. | |
| 2005/0226625 A1 | 10/2005 | Wake et al. | |
| 2005/0232636 A1 | 10/2005 | Durrant et al. | |
| 2005/0242188 A1 | 11/2005 | Vesuna | |
| 2005/0252971 A1 | 11/2005 | Howarth et al. | |
| 2005/0266797 A1 | 12/2005 | Utsumi et al. | |
| 2005/0266854 A1 | 12/2005 | Niiho et al. | |
| 2005/0269930 A1 | 12/2005 | Shimizu et al. | |

(56) References Cited

U.S. PATENT DOCUMENTS

| | | |
|---|---|---|
| 2005/0271396 A1 | 12/2005 | Iannelli |
| 2005/0272439 A1 | 12/2005 | Picciriello et al. |
| 2006/0002326 A1 | 1/2006 | Vesuna |
| 2006/0014548 A1 | 1/2006 | Bolin |
| 2006/0017633 A1 | 1/2006 | Pronkine |
| 2006/0028352 A1 | 2/2006 | McNamara et al. |
| 2006/0040696 A1 | 2/2006 | Lin |
| 2006/0045054 A1 | 3/2006 | Utsumi et al. |
| 2006/0045524 A1 | 3/2006 | Lee et al. |
| 2006/0045525 A1 | 3/2006 | Lee et al. |
| 2006/0053324 A1 | 3/2006 | Giat et al. |
| 2006/0056327 A1 | 3/2006 | Coersmeier |
| 2006/0062579 A1 | 3/2006 | Kim et al. |
| 2006/0083520 A1 | 4/2006 | Healey et al. |
| 2006/0084379 A1 | 4/2006 | O'Neill |
| 2006/0094470 A1 | 5/2006 | Wake et al. |
| 2006/0104643 A1 | 5/2006 | Lee et al. |
| 2006/0159388 A1 | 7/2006 | Kawase et al. |
| 2006/0172775 A1 | 8/2006 | Conyers et al. |
| 2006/0182446 A1 | 8/2006 | Kim et al. |
| 2006/0182449 A1 | 8/2006 | Iannelli et al. |
| 2006/0189354 A1 | 8/2006 | Lee et al. |
| 2006/0209745 A1 | 9/2006 | MacMullan et al. |
| 2006/0223439 A1 | 10/2006 | Pinel et al. |
| 2006/0233506 A1 | 10/2006 | Noonan et al. |
| 2006/0239630 A1 | 10/2006 | Hase et al. |
| 2006/0268738 A1 | 11/2006 | Goerke et al. |
| 2006/0274704 A1 | 12/2006 | Desai et al. |
| 2007/0008939 A1 | 1/2007 | Fischer |
| 2007/0009266 A1 | 1/2007 | Bothwell |
| 2007/0050451 A1 | 3/2007 | Caspi et al. |
| 2007/0054682 A1 | 3/2007 | Fanning et al. |
| 2007/0058978 A1 | 3/2007 | Lee et al. |
| 2007/0060045 A1 | 3/2007 | Prautzsch |
| 2007/0060055 A1 | 3/2007 | Desai et al. |
| 2007/0071128 A1 | 3/2007 | Meir et al. |
| 2007/0076649 A1 | 4/2007 | Lin et al. |
| 2007/0093273 A1 | 4/2007 | Cai |
| 2007/0149250 A1 | 6/2007 | Crozzoli et al. |
| 2007/0166042 A1 | 7/2007 | Seeds et al. |
| 2007/0173288 A1 | 7/2007 | Skarby et al. |
| 2007/0174889 A1 | 7/2007 | Kim et al. |
| 2007/0224954 A1 | 9/2007 | Gopi |
| 2007/0230328 A1 | 10/2007 | Saitou |
| 2007/0243899 A1 | 10/2007 | Hermel et al. |
| 2007/0248358 A1 | 10/2007 | Sauer |
| 2007/0253714 A1 | 11/2007 | Seeds et al. |
| 2007/0257796 A1 | 11/2007 | Easton et al. |
| 2007/0264009 A1 | 11/2007 | Sabat, Jr. et al. |
| 2007/0264011 A1 | 11/2007 | Sone et al. |
| 2007/0268846 A1 | 11/2007 | Proctor et al. |
| 2007/0274279 A1 | 11/2007 | Wood et al. |
| 2007/0292143 A1 | 12/2007 | Yu et al. |
| 2007/0297005 A1 | 12/2007 | Montierth et al. |
| 2008/0002652 A1 | 1/2008 | Gupta et al. |
| 2008/0007453 A1 | 1/2008 | Vassilakis et al. |
| 2008/0013909 A1 | 1/2008 | Kostet et al. |
| 2008/0013956 A1 | 1/2008 | Ware et al. |
| 2008/0013957 A1 | 1/2008 | Akers et al. |
| 2008/0014948 A1 | 1/2008 | Scheinert |
| 2008/0026765 A1 | 1/2008 | Charbonneau |
| 2008/0031628 A1 | 2/2008 | Dragas et al. |
| 2008/0043714 A1 | 2/2008 | Pernu |
| 2008/0056167 A1 | 3/2008 | Kim et al. |
| 2008/0058018 A1 | 3/2008 | Scheinert |
| 2008/0063397 A1 | 3/2008 | Hu et al. |
| 2008/0070502 A1 | 3/2008 | George et al. |
| 2008/0080863 A1 | 4/2008 | Sauer et al. |
| 2008/0098203 A1 | 4/2008 | Master et al. |
| 2008/0118014 A1 | 5/2008 | Reunamaki et al. |
| 2008/0119198 A1 | 5/2008 | Hettstedt et al. |
| 2008/0124086 A1 | 5/2008 | Matthews |
| 2008/0124087 A1 | 5/2008 | Hartmann et al. |
| 2008/0129634 A1 | 6/2008 | Pera et al. |
| 2008/0134194 A1 | 6/2008 | Liu |
| 2008/0145061 A1 | 6/2008 | Lee et al. |
| 2008/0150514 A1 | 6/2008 | Codreanu et al. |
| 2008/0166094 A1 | 7/2008 | Bookbinder et al. |
| 2008/0194226 A1 | 8/2008 | Rivas et al. |
| 2008/0207253 A1 | 8/2008 | Jaakkola et al. |
| 2008/0212969 A1 | 9/2008 | Fasshauer et al. |
| 2008/0219670 A1 | 9/2008 | Kim et al. |
| 2008/0232305 A1 | 9/2008 | Oren et al. |
| 2008/0232799 A1 | 9/2008 | Kim |
| 2008/0247716 A1 | 10/2008 | Thomas |
| 2008/0253280 A1 | 10/2008 | Tang et al. |
| 2008/0253351 A1 | 10/2008 | Pernu et al. |
| 2008/0253773 A1 | 10/2008 | Zheng |
| 2008/0260388 A1 | 10/2008 | Kim et al. |
| 2008/0261656 A1 | 10/2008 | Bella et al. |
| 2008/0268766 A1 | 10/2008 | Narkmon et al. |
| 2008/0268833 A1 | 10/2008 | Huang et al. |
| 2008/0273844 A1 | 11/2008 | Kewitsch |
| 2008/0279137 A1 | 11/2008 | Pernu et al. |
| 2008/0280569 A1 | 11/2008 | Hazani et al. |
| 2008/0291830 A1 | 11/2008 | Pernu et al. |
| 2008/0292322 A1 | 11/2008 | Daghighian et al. |
| 2008/0298813 A1 | 12/2008 | Song et al. |
| 2008/0304831 A1 | 12/2008 | Miller, II et al. |
| 2008/0310464 A1 | 12/2008 | Schneider |
| 2008/0310848 A1 | 12/2008 | Yasuda et al. |
| 2008/0311876 A1 | 12/2008 | Leenaerts et al. |
| 2008/0311944 A1 | 12/2008 | Hansen et al. |
| 2009/0022304 A1 | 1/2009 | Kubler et al. |
| 2009/0028087 A1 | 1/2009 | Nguyen et al. |
| 2009/0028317 A1 | 1/2009 | Ling et al. |
| 2009/0041413 A1 | 2/2009 | Hurley |
| 2009/0047023 A1 | 2/2009 | Pescod et al. |
| 2009/0059903 A1 | 3/2009 | Kubler et al. |
| 2009/0061796 A1 | 3/2009 | Arkko et al. |
| 2009/0061939 A1 | 3/2009 | Andersson et al. |
| 2009/0073916 A1 | 3/2009 | Zhang et al. |
| 2009/0081985 A1 | 3/2009 | Rofougaran et al. |
| 2009/0087179 A1 | 4/2009 | Underwood et al. |
| 2009/0088071 A1 | 4/2009 | Rofougaran |
| 2009/0088072 A1 | 4/2009 | Rofougaran et al. |
| 2009/0135078 A1 | 5/2009 | Lindmark et al. |
| 2009/0141780 A1 | 6/2009 | Cruz-Albrecht et al. |
| 2009/0149221 A1 | 6/2009 | Liu et al. |
| 2009/0154621 A1 | 6/2009 | Shapira et al. |
| 2009/0169163 A1 | 7/2009 | Abbott, III et al. |
| 2009/0175214 A1 | 7/2009 | Sfar et al. |
| 2009/0180407 A1 | 7/2009 | Sabat et al. |
| 2009/0180426 A1 | 7/2009 | Sabat et al. |
| 2009/0218407 A1 | 9/2009 | Rofougaran |
| 2009/0218657 A1 | 9/2009 | Rofougaran |
| 2009/0237317 A1 | 9/2009 | Rofougaran |
| 2009/0245084 A1 | 10/2009 | Moffatt et al. |
| 2009/0245153 A1 | 10/2009 | Li et al. |
| 2009/0245221 A1 | 10/2009 | Piipponen |
| 2009/0247109 A1 | 10/2009 | Rofougaran |
| 2009/0252136 A1 | 10/2009 | Mahany et al. |
| 2009/0252139 A1 | 10/2009 | Ludovico et al. |
| 2009/0252204 A1 | 10/2009 | Shatara et al. |
| 2009/0252205 A1 | 10/2009 | Rheinfelder et al. |
| 2009/0258652 A1 | 10/2009 | Lambert et al. |
| 2009/0265169 A1* | 10/2009 | Dyba .................. G10L 19/012 704/233 |
| 2009/0278596 A1 | 11/2009 | Rofougaran et al. |
| 2009/0279593 A1 | 11/2009 | Rofougaran et al. |
| 2009/0285147 A1 | 11/2009 | Subasic et al. |
| 2009/0316608 A1 | 12/2009 | Singh et al. |
| 2009/0319909 A1 | 12/2009 | Hsueh et al. |
| 2010/0002626 A1 | 1/2010 | Schmidt et al. |
| 2010/0002661 A1 | 1/2010 | Schmidt et al. |
| 2010/0002662 A1 | 1/2010 | Schmidt et al. |
| 2010/0014494 A1 | 1/2010 | Schmidt et al. |
| 2010/0027443 A1 | 2/2010 | LoGalbo et al. |
| 2010/0056200 A1 | 3/2010 | Tolonen |
| 2010/0080154 A1 | 4/2010 | Noh et al. |
| 2010/0080182 A1 | 4/2010 | Kubler et al. |
| 2010/0091475 A1 | 4/2010 | Toms et al. |
| 2010/0118864 A1 | 5/2010 | Kubler et al. |
| 2010/0127937 A1 | 5/2010 | Chandrasekaran et al. |

(56) References Cited

U.S. PATENT DOCUMENTS

| | | |
|---|---|---|
| 2010/0134257 A1 | 6/2010 | Puleston et al. |
| 2010/0142598 A1 | 6/2010 | Murray et al. |
| 2010/0142955 A1 | 6/2010 | Yu et al. |
| 2010/0144285 A1 | 6/2010 | Behzad et al. |
| 2010/0148373 A1 | 6/2010 | Chandrasekaran |
| 2010/0156721 A1 | 6/2010 | Alamouti et al. |
| 2010/0159859 A1 | 6/2010 | Rofougaran |
| 2010/0188998 A1 | 7/2010 | Pernu et al. |
| 2010/0189439 A1 | 7/2010 | Novak et al. |
| 2010/0190509 A1 | 7/2010 | Davis |
| 2010/0202326 A1 | 8/2010 | Rofougaran et al. |
| 2010/0225413 A1 | 9/2010 | Rofougaran et al. |
| 2010/0225520 A1 | 9/2010 | Mohamadi et al. |
| 2010/0225556 A1 | 9/2010 | Rofougaran et al. |
| 2010/0225557 A1 | 9/2010 | Rofougaran et al. |
| 2010/0232323 A1 | 9/2010 | Kubler et al. |
| 2010/0246558 A1 | 9/2010 | Harel |
| 2010/0255774 A1 | 10/2010 | Kenington |
| 2010/0258949 A1 | 10/2010 | Henderson et al. |
| 2010/0260063 A1 | 10/2010 | Kubler et al. |
| 2010/0261501 A1 | 10/2010 | Behzad et al. |
| 2010/0266287 A1 | 10/2010 | Adhikari et al. |
| 2010/0278530 A1 | 11/2010 | Kummetz et al. |
| 2010/0284323 A1 | 11/2010 | Tang et al. |
| 2010/0290355 A1 | 11/2010 | Roy et al. |
| 2010/0309049 A1 | 12/2010 | Reunamäki et al. |
| 2010/0311472 A1 | 12/2010 | Rofougaran et al. |
| 2010/0311480 A1 | 12/2010 | Raines et al. |
| 2010/0329161 A1 | 12/2010 | Ylanen et al. |
| 2010/0329166 A1 | 12/2010 | Mahany et al. |
| 2010/0329680 A1 | 12/2010 | Presi et al. |
| 2011/0002687 A1 | 1/2011 | Sabat, Jr. et al. |
| 2011/0007724 A1 | 1/2011 | Mahany et al. |
| 2011/0007733 A1 | 1/2011 | Kubler et al. |
| 2011/0008042 A1 | 1/2011 | Stewart |
| 2011/0019999 A1 | 1/2011 | George et al. |
| 2011/0021146 A1 | 1/2011 | Pernu |
| 2011/0021224 A1 | 1/2011 | Koskinen et al. |
| 2011/0026932 A1 | 2/2011 | Yeh et al. |
| 2011/0045767 A1 | 2/2011 | Rofougaran et al. |
| 2011/0065450 A1 | 3/2011 | Kazmi |
| 2011/0066774 A1 | 3/2011 | Rofougaran |
| 2011/0069668 A1 | 3/2011 | Chion et al. |
| 2011/0071734 A1 | 3/2011 | Van Wiemeersch et al. |
| 2011/0086614 A1 | 4/2011 | Brisebois et al. |
| 2011/0116393 A1 | 5/2011 | Hong et al. |
| 2011/0116572 A1 | 5/2011 | Lee et al. |
| 2011/0122912 A1 | 5/2011 | Benjamin et al. |
| 2011/0126071 A1 | 5/2011 | Han et al. |
| 2011/0149879 A1 | 6/2011 | Noriega et al. |
| 2011/0158298 A1 | 6/2011 | Djadi et al. |
| 2011/0182230 A1 | 7/2011 | Ohm et al. |
| 2011/0194475 A1 | 8/2011 | Kim et al. |
| 2011/0200328 A1 | 8/2011 | In De Betou et al. |
| 2011/0201368 A1 | 8/2011 | Faccin et al. |
| 2011/0204504 A1 | 8/2011 | Henderson et al. |
| 2011/0206383 A1 | 8/2011 | Chien et al. |
| 2011/0211439 A1 | 9/2011 | Manpuria et al. |
| 2011/0215901 A1 | 9/2011 | Van Wiemeersch et al. |
| 2011/0222415 A1 | 9/2011 | Ramamurthi et al. |
| 2011/0222434 A1 | 9/2011 | Chen |
| 2011/0222619 A1 | 9/2011 | Ramamurthi et al. |
| 2011/0223958 A1 | 9/2011 | Chen et al. |
| 2011/0223960 A1 | 9/2011 | Chen et al. |
| 2011/0223961 A1 | 9/2011 | Chen et al. |
| 2011/0227795 A1 | 9/2011 | Lopez et al. |
| 2011/0237182 A1 | 9/2011 | Stratford et al. |
| 2011/0243201 A1 | 10/2011 | Phillips et al. |
| 2011/0244887 A1 | 10/2011 | Dupray et al. |
| 2011/0256878 A1 | 10/2011 | Zhu et al. |
| 2011/0268033 A1 | 11/2011 | Boldi et al. |
| 2011/0274021 A1 | 11/2011 | He et al. |
| 2011/0281536 A1 | 11/2011 | Lee et al. |
| 2012/0052892 A1 | 3/2012 | Braithwaite .................. 455/501 |
| 2012/0093011 A1* | 4/2012 | Ranta-Aho ........... H04L 5/0007 370/252 |
| 2012/0134666 A1 | 5/2012 | Casterline et al. |
| 2012/0177026 A1 | 7/2012 | Uyehara et al. |
| 2012/0230249 A1 | 9/2012 | Fukumoto et al. |
| 2012/0314797 A1 | 12/2012 | Kummetz et al. |
| 2013/0012195 A1 | 1/2013 | Sabat, Jr. et al. |
| 2013/0017863 A1 | 1/2013 | Kummetz et al. |
| 2013/0070816 A1 | 3/2013 | Aoki et al. ..................... 375/219 |
| 2013/0071112 A1 | 3/2013 | Melester et al. ................. 398/38 |
| 2013/0077502 A1* | 3/2013 | Gainey ............. H04B 7/15578 370/252 |
| 2013/0089332 A1 | 4/2013 | Sauer et al. |
| 2013/0095749 A1 | 4/2013 | Kummetz |
| 2013/0095870 A1 | 4/2013 | Phillips et al. ................ 455/501 |
| 2013/0148560 A1 | 6/2013 | Yang et al. |
| 2013/0210490 A1 | 8/2013 | Fischer et al. |
| 2013/0252651 A1 | 9/2013 | Zavadsky et al. ............ 455/501 |
| 2013/0260705 A1 | 10/2013 | Stratford .................... 455/226.1 |
| 2014/0016583 A1 | 1/2014 | Smith |
| 2014/0024402 A1 | 1/2014 | Singh |
| 2014/0140225 A1 | 5/2014 | Wala |
| 2014/0146797 A1 | 5/2014 | Zavadsky et al. |
| 2014/0146905 A1 | 5/2014 | Zavadsky et al. |
| 2014/0146906 A1 | 5/2014 | Zavadsky et al. |
| 2014/0153919 A1 | 6/2014 | Casterline et al. |
| 2014/0219140 A1 | 8/2014 | Uyehara et al. |
| 2014/0233435 A1 | 8/2014 | Ko |
| 2014/0269859 A1 | 9/2014 | Hanson et al. |
| 2014/0314061 A1 | 10/2014 | Trajkovic et al. |
| 2015/0098351 A1 | 4/2015 | Zavadsky et al. |
| 2015/0098372 A1 | 4/2015 | Zavadsky et al. |
| 2015/0098419 A1 | 4/2015 | Zavadsky et al. |
| 2015/0237586 A1 | 8/2015 | Iwai et al. |
| 2015/0237618 A1* | 8/2015 | Hanson ................. H04L 45/245 370/328 |
| 2015/0249965 A1* | 9/2015 | Dussmann ........... H03G 3/3042 455/501 |
| 2015/0282105 A1* | 10/2015 | Harel .................... H04W 52/52 370/329 |
| 2016/0029328 A1 | 1/2016 | Phillips et al. |
| 2016/0066331 A1* | 3/2016 | Harel .................... H04B 7/024 370/252 |
| 2016/0095068 A1* | 3/2016 | Henia ............. H04B 10/25753 455/127.2 |
| 2016/0360490 A1* | 12/2016 | Henia ............. H04B 10/25753 |

FOREIGN PATENT DOCUMENTS

| | | |
|---|---|---|
| CA | 2065090 C | 2/1998 |
| CA | 2242707 A1 | 1/1999 |
| CN | 101389148 A | 3/2009 |
| CN | 101547447 A | 9/2009 |
| DE | 20104862 U1 | 8/2001 |
| DE | 10249414 A1 | 5/2004 |
| EP | 0477952 A2 | 4/1992 |
| EP | 0477952 A3 | 4/1992 |
| EP | 0461583 B1 | 3/1997 |
| EP | 851618 A2 | 7/1998 |
| EP | 0687400 B1 | 11/1998 |
| EP | 0993124 A2 | 4/2000 |
| EP | 1037411 A2 | 9/2000 |
| EP | 1179895 A1 | 2/2002 |
| EP | 1267447 A1 | 12/2002 |
| EP | 1347584 A2 | 9/2003 |
| EP | 1363352 A1 | 11/2003 |
| EP | 1391897 A1 | 2/2004 |
| EP | 1443687 A1 | 8/2004 |
| EP | 1455550 A2 | 9/2004 |
| EP | 1501206 A1 | 1/2005 |
| EP | 1503451 A1 | 2/2005 |
| EP | 1530316 A1 | 5/2005 |
| EP | 1511203 B1 | 3/2006 |
| EP | 1267447 B1 | 8/2006 |
| EP | 1693974 A1 | 8/2006 |
| EP | 1742388 A1 | 1/2007 |
| EP | 1227605 B1 | 1/2008 |
| EP | 1954019 A1 | 8/2008 |

(56) References Cited

FOREIGN PATENT DOCUMENTS

| | | |
|---|---|---|
| EP | 1968250 A1 | 9/2008 |
| EP | 1056226 B1 | 4/2009 |
| EP | 1357683 B1 | 5/2009 |
| EP | 2276298 A1 | 1/2011 |
| EP | 1570626 B1 | 11/2013 |
| EP | 2925062 A1 | 9/2015 |
| GB | 2323252 A | 9/1998 |
| GB | 2370170 A | 6/2002 |
| GB | 2399963 A | 9/2004 |
| GB | 2428149 A | 1/2007 |
| JP | H4189036 A | 7/1992 |
| JP | 05260018 A | 10/1993 |
| JP | 09083450 A | 3/1997 |
| JP | 09162810 A | 6/1997 |
| JP | 09200840 A | 7/1997 |
| JP | 11068675 A | 3/1999 |
| JP | 2000152300 A | 5/2000 |
| JP | 2000341744 A | 12/2000 |
| JP | 2002264617 A | 9/2002 |
| JP | 2002353813 A | 12/2002 |
| JP | 2003148653 A | 5/2003 |
| JP | 2003172827 A | 6/2003 |
| JP | 2004172734 A | 6/2004 |
| JP | 2004245963 A | 9/2004 |
| JP | 2004247090 A | 9/2004 |
| JP | 2004264901 A | 9/2004 |
| JP | 2004265624 A | 9/2004 |
| JP | 2004317737 A | 11/2004 |
| JP | 2004349184 A | 12/2004 |
| JP | 2005018175 A | 1/2005 |
| JP | 2005087135 A | 4/2005 |
| JP | 2005134125 A | 5/2005 |
| JP | 2007228603 A | 9/2007 |
| JP | 2008172597 A | 7/2008 |
| KR | 20010055088 A | 7/2001 |
| KR | 20110087949 A | 8/2011 |
| WO | 9603823 A1 | 2/1996 |
| WO | 9748197 A2 | 12/1997 |
| WO | 9810600 A1 | 3/1998 |
| WO | 0042721 A1 | 7/2000 |
| WO | 0072475 A1 | 11/2000 |
| WO | 0178434 A1 | 10/2001 |
| WO | 0184760 A1 | 11/2001 |
| WO | 0221183 A1 | 3/2002 |
| WO | 0230141 A1 | 4/2002 |
| WO | 02102102 A1 | 12/2002 |
| WO | 03024027 A1 | 3/2003 |
| WO | 03098175 A1 | 11/2003 |
| WO | 2004030154 A2 | 4/2004 |
| WO | 2004047472 A1 | 6/2004 |
| WO | 2004056019 A1 | 7/2004 |
| WO | 2004059934 A1 | 7/2004 |
| WO | 2004086795 A2 | 10/2004 |
| WO | 2004093471 A2 | 10/2004 |
| WO | 2005062505 A1 | 7/2005 |
| WO | 2005069203 A2 | 7/2005 |
| WO | 2005073897 A1 | 8/2005 |
| WO | 2005079386 A2 | 9/2005 |
| WO | 2005101701 A2 | 10/2005 |
| WO | 2005111959 A2 | 11/2005 |
| WO | 2006011778 A1 | 2/2006 |
| WO | 2006018592 A1 | 2/2006 |
| WO | 2006019392 A1 | 2/2006 |
| WO | 2006039941 A1 | 4/2006 |
| WO | 2006051262 A1 | 5/2006 |
| WO | 2006060754 A2 | 6/2006 |
| WO | 2006077569 A1 | 7/2006 |
| WO | 2006094441 A1 | 9/2006 |
| WO | 2006105185 A2 | 10/2006 |
| WO | 2006133609 A1 | 12/2006 |
| WO | 2006136811 A1 | 12/2006 |
| WO | 2007048427 A1 | 5/2007 |
| WO | 2007075579 A2 | 7/2007 |
| WO | 2007077451 A1 | 7/2007 |
| WO | 2007088561 A1 | 8/2007 |
| WO | 2007091026 A1 | 8/2007 |
| WO | 2008008249 A2 | 1/2008 |
| WO | 2008027213 A2 | 3/2008 |
| WO | 2008033298 A2 | 3/2008 |
| WO | 2008039830 A2 | 4/2008 |
| WO | 2008116014 A2 | 9/2008 |
| WO | 2006046088 A1 | 5/2009 |
| WO | 2009100395 A1 | 8/2009 |
| WO | 2009100396 A1 | 8/2009 |
| WO | 2009100397 A2 | 8/2009 |
| WO | 2009100398 A1 | 8/2009 |
| WO | 2010087919 A2 | 8/2010 |
| WO | 2010090999 A1 | 8/2010 |
| WO | 2010132739 A1 | 11/2010 |
| WO | 2011023592 A1 | 3/2011 |
| WO | 2011043172 A1 | 4/2011 |
| WO | 2011100095 A1 | 8/2011 |
| WO | 2011112373 A1 | 9/2011 |
| WO | 2011139939 A1 | 11/2011 |
| WO | 2011160117 A1 | 12/2011 |
| WO | 2012024345 A2 | 2/2012 |
| WO | 2012054553 A1 | 4/2012 |
| WO | 2012148938 A1 | 11/2012 |
| WO | 2012148940 A1 | 11/2012 |
| WO | 2012170865 A2 | 12/2012 |
| WO | 2013009835 A1 | 1/2013 |
| WO | 2013122915 A1 | 8/2013 |
| WO | 2014040608 A1 | 3/2014 |
| WO | 2014070236 A1 | 5/2014 |
| WO | 2014082070 A1 | 5/2014 |
| WO | 2014082072 A1 | 5/2014 |
| WO | 2014082075 A1 | 5/2014 |
| WO | 2014144314 A1 | 9/2014 |
| WO | 2015054162 A1 | 4/2015 |
| WO | 2015054164 A1 | 4/2015 |
| WO | 2015054165 A1 | 4/2015 |

OTHER PUBLICATIONS

Bakaul, M., et al., "Efficient Multiplexing Scheme for Wavelength-Interleaved DWDM Millimeter-Wave Fiber-Radio Systems," IEEE Photonics Technology Letters, Dec. 2005, vol. 17, No. 12, pp. 2718-2720.

Cho, Bong Youl et al. "The Forward Link Performance of a PCS System with an AGC," 4th CDMA International Conference and Exhibition, "The Realization of IMT-2000," 1999, 10 pages.

Chu, Ta-Shing et al. "Fiber optic microcellular radio", IEEE Transactions on Vehicular Technology, Aug. 1991, pp. 599-606, vol. 40, Issue 3.

Cooper, A.J., "Fiber/Radio for the Provision of Cordless/Mobile Telephony Services in the Access Network," Electronics Letters, 1990, pp. 2054-2056, vol. 26.

Cutrer, David M. et al., "Dynamic Range Requirements for Optical Transmitters in Fiber-Fed Microcellular Networks," IEEE Photonics Technology Letters, May 1995, pp. 564-566, vol. 7, No. 5.

Dolmans, G. et al. "Performance study of an adaptive dual antenna handset for indoor communications", IEE Proceedings: Microwaves, Antennas and Propagation, Apr. 1999, pp. 138-144, vol. 146, Issue 2.

Ellinger, Frank et al., "A 5.2 GHz variable gain LNA MMIC for adaptive antenna combining", IEEE MTT-S International Microwave Symposium Digest, Anaheim, California, Jun. 13-19, 1999, pp. 501-504, vol. 2.

Fan, J.C. et al., "Dynamic range requirements for microcellular personal communication systems using analog fiber-optic links", IEEE Transactions on Microwave Theory and Techniques, Aug. 1997, pp. 1390-1397, vol. 45, Issue 8.

Gibson, B.C., et al., "Evanescent Field Analysis of Air-Silica Microstructure Waveguides," The 14th Annual Meeting of the IEEE Lasers and Electro-Optics Society, 1-7803-7104-4/01, Nov. 12-13, 2001, vol. 2, pp. 709-710.

Huang, C., et al., "A WLAN-Used Helical Antenna Fully Integrated with the PCMCIA Carrier," IEEE Transactions on Antennas and Propagation, Dec. 2005, vol. 53, No. 12, pp. 4164-4168.

(56) References Cited

OTHER PUBLICATIONS

Kojucharow, K., et al., "Millimeter-Wave Signal Properties Resulting from Electrooptical Upconversion," IEEE Transaction on Microwave Theory and Techniques, Oct. 2001, vol. 49, No. 10, pp. 1977-1985.
Monro, T.M., et al., "Holey Fibers with Random Cladding Distributions," Optics Letters, Feb. 15, 2000, vol. 25, No. 4, pp. 206-208.
Moreira, J.D., et al., "Diversity Techniques for OFDM Based WLAN Systems," The 13th IEEE International Symposium on Personal, Indoor and Mobile Radio Communications, Sep. 15-18, 2002, vol. 3, pp. 1008-1011.
Niiho, T., et al., "Multi-Channel Wireless LAN Distributed Antenna System Based on Radio-Over-Fiber Techniques," The 17th Annual Meeting of the IEEE Lasers and Electro-Optics Society, Nov. 2004, vol. 1, pp. 57-58.
Author Unknown, "ITU-T G.652, Telecommunication Standardization Sector of ITU, Series G: Transmission Systems and Media, Digital Systems and Networks, Transmission Media and Optical Systems Characteristics—Optical Fibre Cables, Characteristics of a Single-Mode Optical Fiber and Cable," ITU-T Recommendation G.652, International Telecommunication Union, Jun. 2005, 22 pages.
Author Unknown, "ITU-T G.657, Telecommunication Standardization Sector of ITU, Dec. 2006, Series G: Transmission Systems and Media, Digital Systems and Networks, Transmission Media and Optical Systems Characteristics—Optical Fibre Cables, Characteristics of a Bending Loss Insensitive Single Mode Optical Fibre and Cable for the Access Network," ITU-T Recommendation G.657, International Telecommunication Union, 20 pages.
Opatic, D., "Radio over Fiber Technology for Wireless Access," Ericsson, Oct. 17, 2009, 6 pages.
Paulraj, A.J., et al., "An Overview of MIMO Communications—A Key to Gigabit Wireless," Proceedings of the IEEE, Feb. 2004, vol. 92, No. 2, 34 pages.
Pickrell, G.R., et al., "Novel Techniques for the Fabrication of Holey Optical Fibers," Proceedings of SPIE, Oct. 28-Nov. 2, 2001, vol. 4578, 2001, pp. 271-282.
Roh, W., et al., "MIMO Channel Capacity for the Distributed Antenna Systems," Proceedings of the 56th IEEE Vehicular Technology Conference, Sep. 2002, vol. 2, pp. 706-709.
Schweber, Bill, "Maintaining cellular connectivity indoors demands sophisticated design," EDN Network, Dec. 21, 2000, 2 pages, http://www.edn.com/design/integrated-circuit-design/4362776/Maintaining-cellular-connectivity-indoors-demands-sophisticated-design.
Seto, I., et al., "Antenna-Selective Transmit Diversity Technique for OFDM-Based WLANs with Dual-Band Printed Antennas," 2005 IEEE Wireless Communications and Networking Conference, Mar. 13-17, 2005, vol. 1, pp. 51-56.
Shen, C., et al., "Comparison of Channel Capacity for MIMO-DAS versus MIMO-CAS" The 9th Asia-Pacific Conference on Communications, Sep. 21-24, 2003, vol. 1, pp. 113-118.
Wake, D. et al., "Passive Picocell: A New Concept n Wireless Network Infrastructure," Electronics Letters, Feb. 27, 1997, vol. 33, No. 5, pp. 404-406.
Windyka, John et al., "System-Level Integrated Circuit (SLIC) Technology Development for Phased Array Antenna Applications," Contractor Report 204132, National Aeronautics and Space Administration, Jul. 1997, 94 pages.
Winters, J., et al., "The Impact of Antenna Diversity on the Capacity of Wireless Communications Systems," IEEE Transcations on Communications, vol. 42, No. 2/3/4, Feb./Mar./Apr. 1994, pp. 1740-1751.
Yu et al., "A Novel Scheme to Generate Single-Sideband Millimeter-Wave Signals by Using Low-Frequency Local Oscillator Signal," IEEE Photonics Technology Letters, vol. 20, No. 7, Apr. 1, 2008, pp. 478-480.

Attygalle et al., "Extending Optical Transmission Distance in Fiber Wireless Links Using Passive Filtering in Conjunction with Optimized Modulation," Journal of Lightwave Technology, vol. 24, No. 4, Apr. 2006, 7 pages.
Bo Zhang et al., "Reconfigurable Multifunctional Operation Using Optical Injection-Locked Vertical-Cavity Surface-Emitting Lasers," Journal of Lightwave Technology, vol. 27, No. 15, Aug. 2009, 6 pages.
Chang-Hasnain, et al., "Ultrahigh-speed laser modulation by injection locking," Chapter 6, Optical Fiber Telecommunication V A: Components and Subsystems, Elsevier Inc., 2008, 20 pages.
Cheng Zhang et al., "60 GHz Millimeter-wave Generation by Two-mode Injection-locked Fabry-Perot Laser Using Second-Order Sideband Injection in Radio-over-Fiber System," Conference on Lasers and Electro-Optics and Quantum Electronics, Optical Society of America, May 2008, 2 pages.
Chrostowski, "Optical Injection Locking of Vertical Cavity Surface Emitting Lasers," Fall 2003, PhD dissertation University of California at Berkely, 122 pages.
Dang et al., "Radio-over-Fiber based architecture for seamless wireless indoor communication in the 60GHz band," Computer Communications, Elsevier B.V., Amsterdam, NL, vol. 30, Sep. 8, 2007, pp. 3598-3613.
Hyuk-Kee Sung et al., "Optical Single Sideband Modulation Using Strong Optical Injection-Locked Semiconductor Lasers," IEEE Photonics Technology Letters, vol. 19, No. 13, Jul. 1, 2007, 4 pages.
Lim et al., "Analysis of Optical Carrier-to-Sideband Ratio for Improving Transmission Performance in Fiber-Radio Links," IEEE Transactions of Microwave Theory and Techniques, vol. 54, No. 5, May 2006, 7 pages.
Lu H H et al., "Improvement of radio-on-multimode fiber systems based on light injection and optoelectronic feedback techniques," Optics Communications, vol. 266, No. 2, Elsevier B.V., Oct. 15, 2006, 4 pages.
Pleros et al., "A 60 GHz Radio-Over-Fiber Network Architecture for Seamless Communication With High Mobility," Journal of Lightwave Technology, vol. 27, No. 12, IEEE, Jun. 15, 2009, pp. 1957-1967.
Reza et al., "Degree-of-Polarization-Based PMD Monitoring for Subcarrier-Multiplexed Signals Via Equalized Carrier/Sideband Filtering," Journal of Lightwave Technology, vol. 22, No. 4, IEEE, Apr. 2004, 8 pages.
Zhao, "Optical Injection Locking on Vertical-Cavity Surface-Emitting Lasers (VCSELs): Physics and Applications," Fall 2008, PhD dissertation University of California at Berkeley, pp. 1-209.
Author Unknown, "VCSEL Chaotic Synchronization and Modulation Characteristics," Master's Thesis, Southwest Jiatong University, Professor Pan Wei, Apr. 2006, 8 pages (machine translation).
Chowdhury et al., "Multi-service Multi-carrier Broadband MIMO Distributed Antenna Systems for In-building Optical Wireless Access," Presented at the 2010 Conference on Optical Fiber Communication and National Fiber Optic Engineers Conference, Mar. 21-25, 2010, San Diego, California, IEEE, pp. 1-3.
Non-Final Office Action for U.S. Appl. No. 14/473,256, mailed Oct. 6, 2016, 28 pages.
Notice of Allowance for U.S. Appl. No. 14/496,410, mailed Apr. 12, 2016, 7 pages.
Examination Report for European Patent Application No. 15161149.8, mailed Jun. 21, 2016, 5 pages.
European Search Report for application No. 15161149.8, dated Jun. 18, 2015, 7 pages.
Seto et al., "Optical Subcarrier Multiplexing Transmission for Base Station With Adaptive Array Antenna," IEEE Transactions on Microwave Theory and Techniques, vol. 49, No. 10, Oct. 2001, pp. 2036-2041.
Biton et al., "Challenge: CeTV and Ca-Fi—Cellular and Wi-Fi over CATV," Proceedings of the Eleventh Annual International Conference on Mobile Computing and Networking, Aug. 28-Sep. 2, 2005, Cologne, Germany, Association for Computing Machinery, 8 pages.
Non-final Office Action for U.S. Appl. No. 14/473,256 mailed Mar. 8, 2016, 16 pages.
International Search Report for PCT/IL2015/050862 mailed Dec. 3, 2015, 5 pages.

(56) References Cited

OTHER PUBLICATIONS

Non-final Office Action for U.S. Appl. No. 14/496,410 mailed Dec. 23, 2015, 11 pages.
Non-Final Office Action for U.S. Appl. No. 15/237,917, mailed Nov. 17, 2016, 19 pages.

* cited by examiner

INDIVIDUALIZED GAIN CONTROL OF UPLINK PATHS IN REMOTE UNITS IN A DISTRIBUTED ANTENNA SYSTEM (DAS) BASED ON INDIVIDUAL REMOTE UNIT CONTRIBUTION TO COMBINED UPLINK POWER

CROSS-REFERENCE TO RELATED APPLICATION

This application claims the benefit of U.S. Provisional Application No. 61/971,770 filed on Mar. 28, 2014, the content of which is relied upon and incorporated herein by reference in its entirety.

BACKGROUND

The technology of the present disclosure relates generally to distributed antenna systems (DASs) that support distributing communications services to remote units, and particularly to individualized automatic level control of remote units based on their respective contributions to combined uplink power.

Wireless communication is rapidly growing, with ever-increasing demands for high-speed mobile data communication. As an example, local area wireless services such as WiFi and wide area wireless services are widely deployed. Distributed communications systems communicate with wireless devices called "clients," "client devices," or "wireless client devices," which must reside within the wireless range or "cell coverage area" in order to communicate with an access point device. DASs are particularly useful to be deployed inside buildings or other indoor environments where client devices may not otherwise be able to effectively receive radio-frequency (RF) signals from a source, such as a base station for example. Example applications where DASs can be used to provide or enhance coverage for wireless services include public safety, cellular telephony, wireless local access networks (LANs), location tracking, and medical telemetry inside buildings and over campuses.

One approach to deploying a DAS involves the use of RF antenna coverage areas. Antenna coverage areas can be formed by remotely distributed antenna units, or remote units (RUs). The remote units each contain or are configured to couple to one or more antennas configured to support the desired frequency(ies) or polarization to provide the coverage areas. Antenna coverage areas can have a radius in the range from a few meters up to twenty meters. Combining a number of remote units creates an array of antenna coverage areas. Because the antenna coverage areas each cover small areas, there typically may be only a few users (clients) per antenna coverage area. This arrangement generates a uniform high quality signal enabling high throughput supporting the required capacity.

As an example, FIG. 1 illustrates distribution of communications services to coverage areas 10(1)-10(N) of a DAS 12, wherein 'N' is the number of coverage areas. These communications services can include cellular services, wireless services such as RFID tracking, Wireless Fidelity (WiFi), local area network (LAN), WLAN, and combinations thereof, as examples. The coverage areas 10(1)-10(N) may be remotely located. In this regard, the remote coverage areas 10(1)-10(N) are created by and centered on remote antenna units 14(1)-14(N) connected to a central unit 16 (e.g., a head-end controller or head-end unit). The central unit 16 may be communicatively coupled to a base station 18. In this regard, the central unit 16 receives downlink communications signals 20D from the base station 18 to be distributed to the remote antenna units 14(1)-14(N). The remote antenna units 14(1)-14(N) are configured to receive downlink communications signals 20D from the central unit 16 over a communications medium 22 to be distributed to the respective coverage areas 10(1)-10(N) of the remote antenna units 14(1)-14(N). Each remote antenna unit 14(1)-14(N) may include an RF transmitter/receiver (not shown) and a respective antenna 24(1)-24(N) operably connected to the RF transmitter/receiver to wirelessly distribute the communications services to client devices 26 within their respective coverage areas 10(1)-10(N). The remote antenna units 14(1)-14(N) are also configured to receive uplink communications signals 20U from the client devices 26 in their respective coverage areas 10(1)-10(N) to be distributed to the base station 18. The size of a given coverage area 10(1)-10(N) is determined by the amount of RF power transmitted by the respective remote antenna unit 14(1)-14(N), the receiver sensitivity, antenna gain and the RF environment, as well as by the RF transmitter/receiver sensitivity of the client device 26. Client devices 26 usually have a fixed RF receiver sensitivity, so that the above-mentioned properties of the remote antenna units 14(1)-14(N) mainly determine the size of their respective remote coverage areas 10(1)-10(N).

In the DAS 12 in FIG. 1, the uplink gain in each remote antenna unit 14(1)-14(N) determines its sensitivity. Higher gain provides higher sensitivity (i.e., increased ability to decode weak uplink communications signals 20U). Each unit 14(1)-14(N) in the DAS 12 in FIG. 1 may include automatic level controllers (ALCs) 28(1)-28(N) that limit the power level of the received incoming uplink communications signals 20U to a predetermined power level. The ALCs 28(1)-28(N) can be used in the remote antenna units 14(1)-14(N) to avoid strong incoming uplink communications signals 20U overloading the communications signal processing circuitry (e.g., an amplifier) and distorting the uplink communications signal 20U. As another example, if the DAS 12 is an optical fiber-based DAS in which the remote antenna units 14(1)-14(N) convert the uplink communications signal 20U to optical uplink signals, a strong uplink communications signal 20U could overload the laser diode (not shown) used to convert the uplink communications signal 20U to optical uplink signals.

Further, the multiple received uplink communications signals 20U arriving at the remote antenna units 14(1)-14(N) are summed in the central unit 16. However, it may also be desired that the summed multiple received uplink communications signals 20U in the central unit 16 not exceed a defined threshold aggregated power in the central unit 16 or at the base station 18. Even though the individual signal level of each received uplink communications signals 20U in the remote antenna units 14(1)-14(N) can be controlled by the ALCs 28(1)-28(N) to be within power level limits of the individual remote antenna units 14(1)-14(N), the power level of the combined uplink communications signals 20U may be high enough to overload the signal processing circuitry in the central unit 16. Thus, to keep the combined uplink communications signals 20D in the central unit 16 below a desired maximum power level, the ALCs 28(1)-28(N) in the remote antenna units 14(1)-14(N) can be controlled to reduce the gain level of the individual uplink communications signals 20U received in each remote antenna unit 14(1)-14(N). However, the sensitivity of the uplink paths in the remote antenna units 14(1)-14(N) are reduced as a result. This may result in the signal level of a particular uplink communications signal 20U within a given remote antenna unit 14(1)-14(N) being lower than desired for processing within the remote antenna unit 14(1)-14(N) and/or not reaching the base station 18 with enough power.

Therefore, this creates a dilemma in that gain set by the ALCs 28(1)-28(N) must be set high enough to achieve the desired sensitivity but also avoid the combined uplink communications signals 20U from overloading the central unit 16 and/or the base station 18. The gain set by the ALCs 28(1)-28(N) may also need to be set high enough to allow uplink signals 20U to reach the central unit 16 and base station 18 without enough power.

SUMMARY

Embodiments disclosed herein include individualized gain control of uplink paths in remote units in a distributed antenna system (DAS) based on individual remote unit contribution to combined uplink power. In one embodiment, the combined uplink power of a combined uplink communications signal comprised of a combined plurality of received uplink communications signals in a central unit is measured. If the combined uplink power level of the combined uplink communications signal exceeds a defined central unit threshold uplink power level, the gain of certain uplink paths in the remote unit is reduced. The gain is reduced for the uplink paths of individual remote units, which provide higher power contribution to the combined uplink power of combined uplink communications signals in the central unit. This allows the initial uplink gain of all remote units to be set higher to increase sensitivity, because the gain of the remote units that provide higher power contributions to the combined uplink power in the central unit can be reduced without reducing the gain in the other remote units that would otherwise reduce their sensitivity. This is opposed to reducing the gain of uplink paths in the remote units equally in response to the combined uplink power being higher than desired, which would result in reduced sensitivity of all the remote units.

One embodiment of the disclosure relates to a central gain control system for providing individualized gain control of at least one uplink path in remote units in a distributed antenna system (DAS) based on an individual remote unit contribution to a combined uplink power. The central gain control system comprises a central uplink power measurement circuit. The central uplink power measurement circuit is coupled to a central uplink path in a central unit carrying a combined uplink communications signal comprised of a combined plurality of received uplink communications signals from a plurality of remote units. The central uplink power measurement circuit is configured to measure a combined uplink power of the combined uplink communications signal. The central uplink power measurement circuit is also configured to provide a combined uplink power measurement indicative of the combined uplink power of the combined uplink communications signal. The central gain control system also comprises a central controller. The central controller is configured to receive the combined uplink power measurement indicative of the combined uplink power of the combined uplink communications signal. The central controller is also configured to receive individual remote uplink power measurements of a remote uplink power for each remote uplink path of the plurality of remote units. The central controller is also configured to determine if the combined uplink power measurement is greater than a central uplink threshold power level. If the combined uplink power measurement is greater than the central uplink threshold power level, the central controller is also configured to identify as a high power remote uplink path, at least one remote uplink path in at least one remote unit among the plurality of remote units that has an individual remote uplink power measurement above a remote uplink threshold power level, and direct a remote uplink gain control circuit for at least one remote uplink path identified as a high power remote uplink path in at least one remote unit among the plurality of remote units, to reduce the uplink gain of the respective remote uplink path by a defined remote uplink gain level reduction.

Another embodiment of the disclosure relates to a method of providing individualized gain control of uplink paths in remote units in a DAS based on individual remote unit contribution to a combined uplink power. The method comprises measuring a combined uplink power of combined uplink communications signal comprised of a combined plurality of uplink communications signals received from a plurality of remote units, and providing a combined uplink power measurement indicative of the combined uplink power of the combined uplink communications signal. The method also comprises receiving individual remote uplink power measurements of a remote uplink power for each remote uplink path of the plurality of remote units. The method also comprises determining if the combined uplink power measurement is greater than a central uplink threshold power level. If the combined uplink power measurement is greater than a central uplink threshold power level, the method also comprises identifying as a high power remote uplink path, all remote uplink paths in at least one remote unit among the plurality of remote units that have an individual remote uplink power measurement above a remote uplink threshold power level, and directing a remote uplink gain control circuit for the remote uplink path identified as a high power remote uplink path in at least one remote unit, to reduce the uplink gain of the respective remote uplink path by a defined remote uplink gain level reduction.

Another embodiment relates to a DAS having a central unit configured to receive at least one downlink communications signal from a network. The central unit is also configured to distribute the received at least one downlink communications signal to a plurality of remote units, and to receive a plurality of uplink communications signals from the plurality of remote units. The central unit is also configured to combine the received plurality of uplink communications signals into a combined uplink communications signal in a central uplink path, and to distribute the received uplink communications signals to the network. The DAS also comprises a central uplink power measurement circuit coupled to the central uplink path in carrying the combined uplink communications signal. The central uplink power measurement circuit is configured to measure a combined uplink power of the combined uplink communications signal. The central uplink power measurement circuit is also configured to provide a combined uplink power measurement indicative of the combined uplink power of the combined uplink communications signal. The DAS also comprises a central uplink gain control circuit disposed in the central uplink path in the central unit, the central uplink gain control circuit configured to adjust a combined uplink gain of the central uplink path based on a combined uplink gain adjustment signal.

Further, the DAS also comprises a central controller configured to receive the combined uplink power measurement indicative of the combined uplink power of the combined uplink communications signal. The central controller is also configured to receive individual remote uplink power measurements of remote uplink power for each remote uplink path of the plurality of remote units, and to determine if the combined uplink power measurement is greater than a central uplink threshold power level. If the combined uplink power measurement is greater than the central uplink threshold power level, the central controller is also configured to identify as a high power remote uplink paths, at least one remote uplink path in at least one remote unit that have an individual remote uplink power measurement above a remote uplink threshold power level, and send at least one remote uplink gain control signal to a remote uplink gain control circuit for the remote uplink path identified as a high power remote uplink path in at least one remote unit.

Additional features are set forth in the detailed description, and in part, will be readily apparent to those skilled in the art. The foregoing general description and the following detailed description are merely exemplary, and are intended to provide an overview or framework to understand the nature and character of the claims. The drawings provide a further understanding and are incorporated in and constitute a part of this specification.

DETAILED DESCRIPTION

Figure 1:
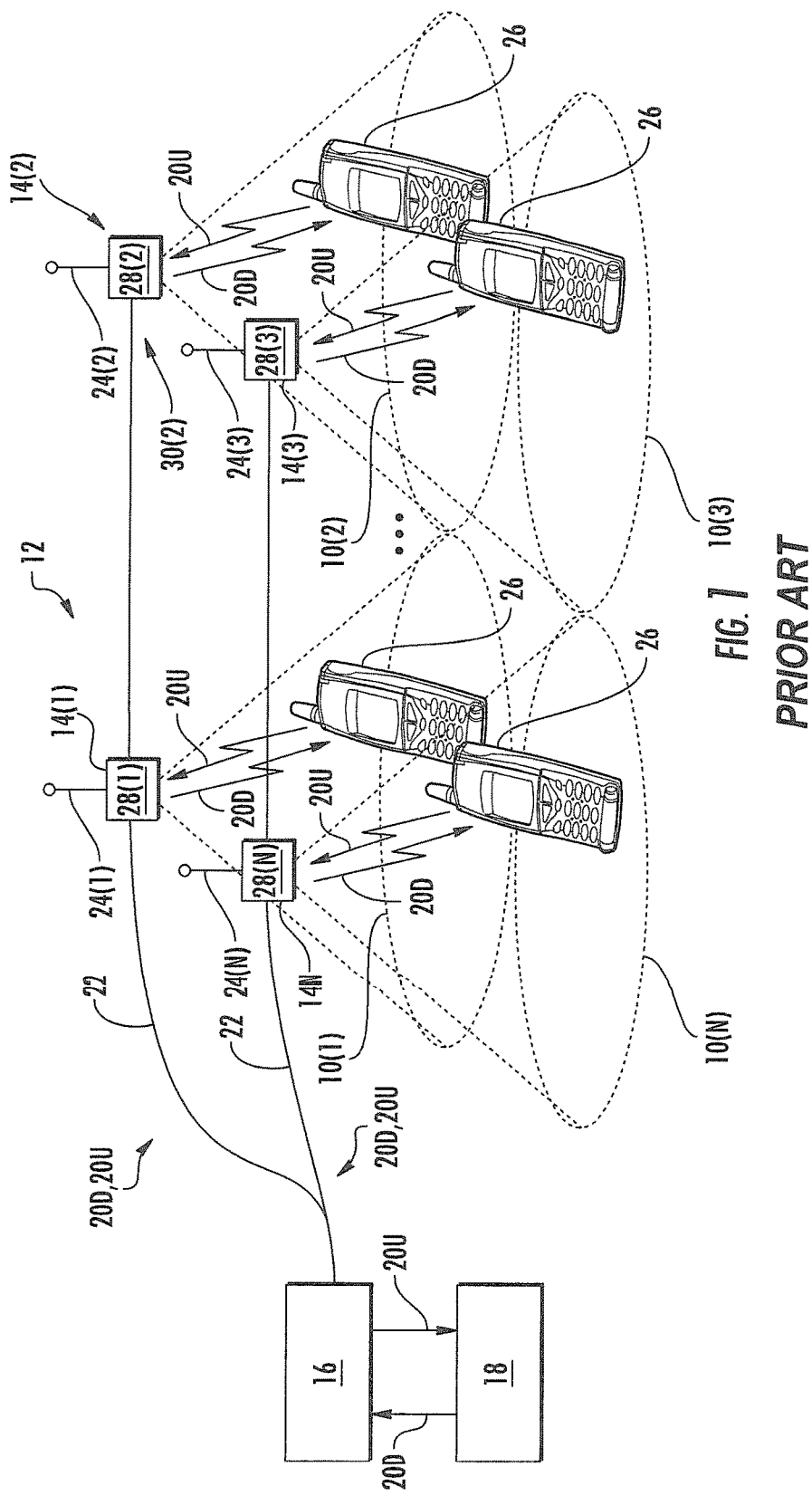
FIG. 1 is a schematic diagram of an exemplary distributed antenna system (DAS) capable of distributing radio frequency (RF) communications services to client devices.
Figure 2:
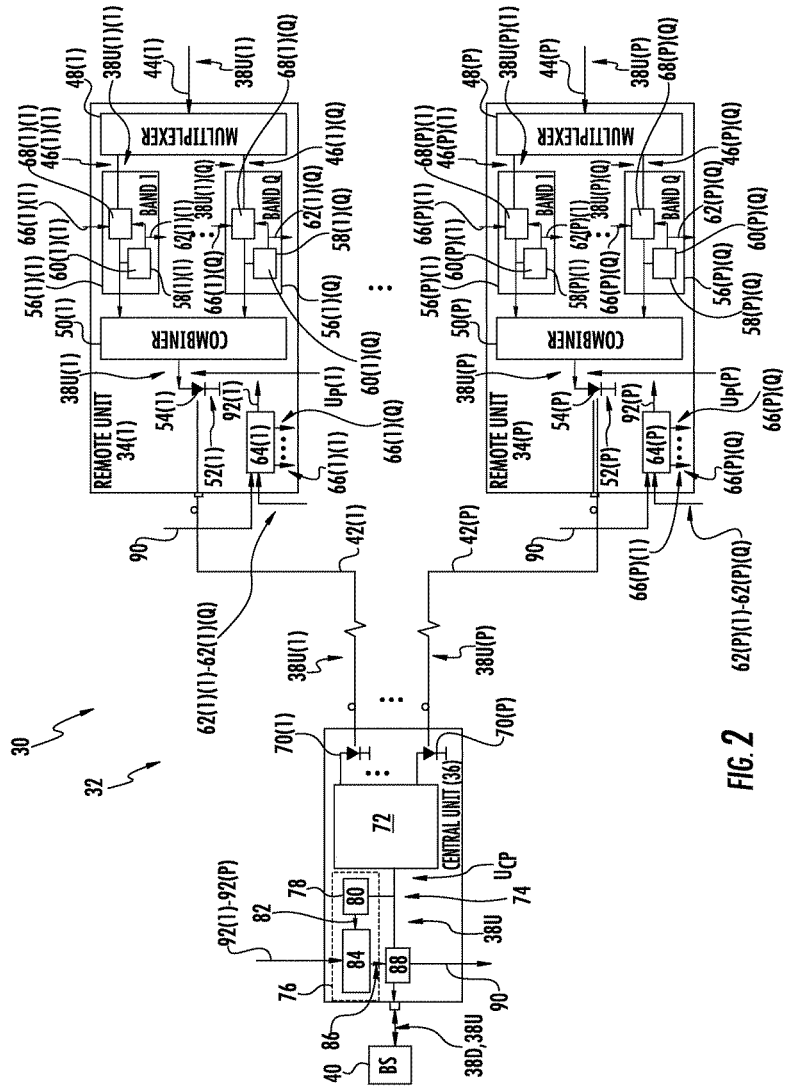
FIG. 2 is a schematic diagram of an exemplary DAS employing an exemplary gain control system configured to individually control the uplink path gain in the remote units based on the individual remote unit contribution to the combined uplink power.

FIG. 2 is a schematic diagram of an exemplary distributed antenna system (DAS) 30. As will be discussed in more detail below, the DAS 30 employs an exemplary gain control system 32 configured to individually control the uplink path gain in remote units 34(1)-34(P) based on individual remote unit 34 contribution to a combined uplink power $U_{CP}$ in a central unit 36. The gain is reduced for the uplink paths of individual remote units 34(1)-34(P) which provide higher power contribution to a combined uplink power $U_{CP}$ in the central unit 36. As will be discussed in more detail below, this allows the initial uplink gain of all remote units 34(1)-34(P) to be set higher to increase sensitivity, because the gain of the remote units 34(1)-34(P) that provide higher power contributions to the combined uplink power $U_{CP}$ in the central unit 36 can be reduced if the combined uplink power $U_{CP}$ exceeds the desired threshold power level. The gain of the remote units 34(1)-34(P) that provide higher power contributions to the combined uplink power $U_{CP}$ in the central unit 36 can be reduced without reducing the gain in the other remote units 34(1)-34(P) that would otherwise reduce their sensitivity. This is opposed to reducing the gain level of uplink paths in the remote units 34(1)-34(P) equally in response to a combined uplink power $U_{CP}$ in the central unit 36 being higher than desired, which would result in reduced sensitivity of all the remote units 34(1)-34(P). Before discussing the gain control system 32 of the DAS 30, the components of the DAS 30 are first described below.

As shown in FIG. 2, the central unit 36 is provided. The central unit 36 is configured to receive one or more downlink communications signals 38D from a base station 40 or other network device to be distributed to the plurality of remote units 34(1)-34(P). There are 'P' number of remote units 34 provided in the DAS 30. The central unit 36 is configured to distribute the received downlink communications signals 38D over a downlink communications medium (not shown) to the remote units 34(1)-34(P) to be distributed to client devices in communication, wired and/or wirelessly, with the remote units 34(1)-34(P). The central unit 36 is also configured to receive a plurality of uplink communications signals 38U(1)-38U(P) from the plurality of remote units 34(1)-34(P) to be distributed to the base station 40. As shown in FIG. 2, in this example, separate uplink communications medium 42(1)-42(P) are provided to communicatively couple the central unit 36 to each remote unit 34(1)-34(P), respectively. The remote units 34(1)-34(P) are each configured to receive the uplink communications signals 38U(1)-38U(P) over respective antenna ports 44(1)-44(P). The uplink communications signals 38U(1)-38U(P) are distributed over one or more remote uplink paths 46(1)-46(P) in the respective remote units 34(1)-34(P).

As shown in FIG. 2, each remote unit 34(1)-34(P) may include more than one remote uplink path 46(1)(1)-46(1)(Q)-46(P)(1)-46(P)(Q), where 'Q' is the number of remote uplink paths. For example, each remote uplink path 46(1)(1)-46(1)(Q)-46(P)(1)-46(P)(Q) may be configured to support a different frequency band of the possible uplink communications signals 38U(1)-38U(P) supported by the DAS 30. A multiplexer 48(1)-48(P) provided in the remote units 34(1)-34(P) is configured to separate out the different frequency bands in the respective received uplink communications signals 38U(1)-38U(P) to direct the separate frequency bands of uplink communications signals 38U(1)-38U(P) to the correct remote uplink path 46(1)(1)-46(1)(Q)-46(P)(1)-46(P)(Q). For example, the received uplink communications signal 38U(1) in remote unit 34(1) may be separated by the multiplexer 48(1) into uplink communications signals 38U(1)(1)-38U(1)(Q), where 'Q' is the number of frequency bands supported by the remote unit 34(1). Similarly, the received uplink communications signal 38U(P) in remote unit 34(P) may be separated by the multiplexer 48(P) into uplink communications signals 38U(P)(1)-38U(P)(Q) of 'Q' different frequency bands. The remote units 34(1)-34(P) include remote uplink combiners 50(1)-50(P). The remote uplink combiners 50(1)-50(P) are configured to combine the respective uplink communications signals 38U (1)(1)-38U(1)(Q)-38U(P)(1)-38U(P)(Q) from each remote uplink path 46(1)(1)-46(1)(Q)-46(P)(1)-46(P)(Q) in its respective remote unit 34(1)-34(P) into combined uplink signals 38U(1)-38U(P) to be distributed to the central unit 36.

With continuing reference to FIG. 2, the DAS 30 is an optical fiber-based DAS. In this regard, each remote unit 34(1)-34(P) has an electrical-to-optical (E-O) converter 52(1)-52(P) in the form of laser diodes 54(1)-54(P) that are configured to convert the electrical uplink communications signals 38U(1)-38U(P) into optical uplink communications signals 38U(1)-38U(P) to be distributed over optical uplink communications medium 42(1)-42(P) to the central unit 36. Because the uplink communications signals 38U(1)-38U(P) may be received by the remote units 34(1)-34(P) at power levels that could overload the laser diodes 54(1)-54(P) and thus cause non-linearity issues with E-O signal conversions, each remote uplink path 46(1)(1)-46(1)(Q)-46(P)(1)-46(P)(Q) in the remote units 34(1)-34(P) in this example includes a remote uplink gain control system 56(1)(1)-56(1)(Q)-56(P)(1)-56(P)(Q). The remote uplink gain control systems 56(1)(1)-56(1)(Q)-56(P)(1)-56(P)(Q) are configured to limit the uplink power $U_P(1)$-$U_P(P)$ of the combined uplink signals 38U(1)-38U(P) applied to the laser diodes 54(1)-54(P) to respective remote uplink threshold power level. Note that if a remote unit 34 only had one remote uplink path 46, only one remote uplink gain control system 56 could be provided in that remote unit 34.

In this regard, with continuing reference to FIG. 2, each remote uplink gain control system 56(1)(1)-56(1)(Q)-56(P)(1)-56(P)(Q) includes a remote uplink power measurement circuit 58(1)(1)-58(1)(Q)-58(P)(1)-58(P)(Q). The remote uplink power measurement circuits 58(1)(1)-58(1)(Q)-58(P)(1)-58(P)(Q) in this example are comprised of power detectors 60(1)(1)-60(1)(Q)-60(P)(1)-60(P)(Q) that are configured to measure power or another measurement that can be correlated to power. Each power detector 60(1)(1)-60(1)(Q)-60(P)(1)-60(P)(Q) is configured measure a remote uplink power of the received uplink communications signals 38U(1)(1)-38U(1)(Q)-38U(P)(1)-38U(P)(Q) in the remote uplink paths 46(1)(1)-46(1)(Q)-46(P)(1)-46(P)(Q) after being attenuated by remote uplink gain control circuits 68(1)(1)-68(1)(Q)-68(P)(1)-68(P)(Q) discussed below. The power detectors 60(1)(1)-60(1)(Q)-60(P)(1)-60(P)(Q) are also configured to provide remote uplink power measurements 62(1)(1)-62(1)(Q)-62(P)(1)-62(P)(Q) indicative of the remote uplink power of the respective attenuated uplink communications signal 38U(1)(1)-38U(1)(Q)-38U(P)(1)-38U(P)(Q) in the respective remote uplink paths 46(1)(1)-46(1)(Q)-46(P)(1)-46(P)(Q) to respective remote controllers 64(1)-64(P) provided in the remote units 34(1)-34(P).

With continuing reference to FIG. 2, the remote controllers 64(1)-64(P) determine if any remote uplink gains in the respective remote uplink paths 46(1)(1)-46(1)(Q)-46(P)(1)-46(P)(Q) should be adjusted or limited based on the measured respective remote uplink power of the received uplink communications signals 38U(1)(1)-38U(1)(Q)-38U(P)(1)-38U(P)(Q). If so, the remote controllers 64(1)-64(P) are configured to issue respective remote uplink gain adjustment signals 66(1)(1)-66(1)(Q)-66(P)(1)-66(P)(Q) to respective remote uplink gain control circuits 68(1)(1)-68(1)(Q)-68(P)(1)-68(P)(Q) provided in the remote uplink gain control systems 56(1)(1)-56(1)(Q)-56(P)(1)-56(P)(Q). The remote uplink gain control circuits 68(1)(1)-68(1)(Q)-68(P)(1)-68(P)(Q) may be provided as automatic gain level (ALCs) or automatic gain controllers (AGCs), as non-limiting examples. The remote uplink gain control circuits 68(1)(1)-68(1)(Q)-68(P)(1)-68(P)(Q) are disposed in the respective remote uplink paths 46(1)(1)-46(1)(Q)-46(P)(1)-46(P)(Q). The remote uplink gain control circuits 68(1)(1)-68(1)(Q)-68(P)(1)-68(P)(Q) are configured to adjust the remote uplink gain in the remote uplink paths 46(1)(1)-46(1)(Q)-46(P)(1)-46(P)(Q) based on respective received remote uplink gain adjustment signals 66(1)(1)-66(1)(Q)-66(P)(1)-66(P)(Q) from the respective remote unit controllers 64(1)-64(P). As discussed above, the remote uplink gain control circuits 68(1)(1)-68(1)(Q)-68(P)(1)-68(P)(Q) may also independently limit the remote uplink gain in the remote uplink paths 46(1)(1)-46(1)(Q)-46(P)(1)-46(P)(Q) can be employed to limit the remote uplink power $U_P(1)$-$U_P(P)$ applied to the laser diodes 54(1)-54(P) of the respective remote units 34(1)-34(P) to prevent overloading.

Note that in this example, a dedicated remote controller 64(1)-64(P) is provided in each remote unit 34(1)-34(P), the functionality of the remote controllers 64(1)-64(P) could be part of another internal controller in the respective remote units 34(1)-34(P) or a controller external to the remote units 34(1)-34(P).

With continuing reference to FIG. 2, as discussed above, the optical uplink communications signals 38U(1)-38U(P) are received by the central unit 36 over the uplink communications medium 42(1)-42(P). In this embodiment, the central unit 36 includes uplink optical-to-electrical (O-E) converters 70(1)-70(P) to convert the optical uplink communications signals 38U(1)-38U(P) back to electrical uplink communications signals 38U(1)-38U(P). The electrical uplink communications signals 38U(1)-38U(P) are then processed (e.g., amplified) and combined by uplink combiner 72 into a combined uplink communications signal 38U in a central uplink path 74. To prevent the central combined uplink power $U_{PC}$ of the combined uplink communications signal 38U in the central unit 36 from exceeding a central uplink threshold power level, a central uplink gain control system 76 is provided in the central unit 36. The central uplink gain control system 76 includes a central uplink power measurement circuit 78. The central uplink power measurement circuit 78 is coupled to the central uplink path 74 carrying the combined uplink communications signal 38U. The central uplink power measurement circuit 78 in this example is comprised of power detectors 80 that are each configured to measure power or another measurement that can be correlated to power. The power detector 80 is configured to measure the central combined uplink power $U_{PC}$ of the combined uplink communications signal 38U in the central uplink path 74. The power detector 80 is also configured to provide a central uplink power measurement 82 to a central controller 84 provided in the central unit 36.

With continuing reference to FIG. 2, the central controller 84 determines if the central combined uplink power $U_{PC}$ in the central uplink paths 74 should be adjusted or limited to prevent an overload condition. If so, the central controller 84 is configured to issue a central uplink gain adjustment signal 86 to a central uplink gain control circuit 88 provided in the central uplink gain control system 76. The central uplink gain control circuit 88 may be an ALC or AGC, as examples. The central uplink gain control circuit 88 is disposed in the central uplink paths 74 and is configured to limit or adjust the central combined uplink power $U_{PC}$ of the combined uplink communications signal 38U in the central uplink path 74. For example, the central uplink gain control circuit 88 may be configured to limit the combined uplink power $U_{PC}$ of the combined uplink communications signal 38U to be above a central uplink threshold power level to prevent overloading of the base station 40 that receives the uplink communications signal 38U from the central unit 36.

With continuing reference to the DAS 30 in FIG. 2, though the remote uplink power of each received uplink communications signals 38U(1)-38U(P) in the remote units 34(1)-34(P) can be controlled by remote uplink gain control systems 56(1)(1)-56(1)(Q)-56(P)(1)-56(P)(Q) to be within desired power limits or below a remote uplink threshold power level, the power level of the uplink communications signals 38U(1)-38U(P) when combined into the combined uplink communications signal 38U in the central unit 36 may still have a high enough combined uplink power $U_{PC}$ to overload the base station 40. For example, if the upload communications signals 38U(1)-38U(P) of remote uplink power level Pi (dBm) exist at each remote unit 34(1)-34(P), the summed remote uplink power of the combined upload communications signals 38U of N remote units will be equal to Pi+(10×Log(N)+G), wherein G is the gain in the remote uplink paths 46(1)(1)-46(1)(Q)-46(P)(1)-46(P)(Q) assuming G is equal for all remote uplink paths 46(1)(1)-46(1)(Q)-46(P)(1)-46(P)(Q) for all frequency bands of the upload communications signals 38U(1)-38U(P). Thus, to keep the combined uplink power $U_{PC}$ of the combined uplink communications signal 38U in the central unit 36 below a desired maximum power level, the remote uplink gain control systems 56(1)(1)-56(1)(Q)-56(P)(1)-56(P)(Q) in the remote units 34(1)-34(P) can be additionally controlled by the central controller 84 in the central unit 36 to reduce the remote uplink gain of the individual uplink communications signals 38U(1)(1)-38U(1)(Q)-38U(P)(1)-38U(P)(Q) received in each remote unit 34(1)-34(P) based on the combined uplink power $U_{PC}$ in the central unit 36.

In this regard, the central controller 84 in the DAS 30 in FIG. 2 can send a remote uplink gain control signal 90 to the remote controllers 64(1)-64(P) for the remote units 34(1)-34(P). In response, the remote controllers 64(1)-64(P) can issue the remote uplink gain adjustment signals 66(1)(1)-66(1)(Q)-66(P)(1)-66(P)(Q) to respective remote uplink gain control circuits 68(1)(1)-68(1)(Q)-68(P)(1)-68(P)(Q) provided in the remote uplink gain control systems 56(1)(1)-56(1)(Q)-56(P)(1)-56(P)(Q) to limit the remote uplink power of the individual uplink communications signals 38U(1)(1)-38U(1)(Q)-38U(P)(1)-38U(P)(Q). Thus, the gain control system 32 in the DAS 30 in FIG. 2 is configured to adjust the remote uplink gains of the remote uplink paths 46(1)(1)-46(1)(Q)-46(P)(1)-46(P)(Q) based on either the remote uplink power in the respective remote uplink paths 46(1)(1)-46(1)(Q)-46(P)(1)-46(P)(Q), or the combined uplink power $U_{PC}$ of the combined uplink communications signal 38U in the central unit 36.

However, if the remote gain level of the remote uplink paths 46(1)(1)-46(1)(Q)-46(P)(1)-46(P)(Q) is adjusted to reduce the remote gain level due to the combined uplink power $U_{PC}$ of the combined uplink communications signal 38U exceeding the central uplink power threshold, the sensitivity of the remote uplink paths 46(1)(1)-46(1)(Q)-46(P)(1)-46(P)(Q) in the remote units 34(1)-34(P) are reduced as a result. In the case where a weak uplink communications signal 38U(1)(1)-38U(1)(Q)-38U(P)(1)-38U(P)(Q) is also received at that uplink path, together with the strong signal that caused the gain reduction of that uplink path, the power level of the weak uplink communications signal 38U(1)(1)-38U(1)(Q)-38U(P)(1)-38U(P)(Q) might go below the sensitivity threshold. In other words, weak uplink signal 38U(1)(1)-38U(1)(Q)-38U(P)(1)-38U(P)(Q) would be a lower power level than desired when reaching the base station 40, and as a result not being able to be decoded within the base station 40. Therefore, this creates a dilemma in that the gain of the remote units 34(1)-34(P) should be set high for increased sensitivity and/or to allow low power level uplink communications signals 38U(1)(1)-38U(1)(Q)-38U(P)(1)-38U(P)(Q) to pass through the remote uplink paths 46(1)(1)-46(1)(Q)-46(P)(1)-46(P)(Q) of the remote units 34(1)-34(P) with high enough power to reach the base station 40, but also avoid the high power level uplink signals 38U(1)(1)-38U(1)(Q)-38U(P)(1)-38U(P)(Q) causing the combined uplink power $U_{PC}$ of the combined uplink communications signal 38U to exceed the central uplink threshold power level of the central unit 36 and/or the base station 40.

In this regard, the central controller 84 in the central unit 36 is configured to provide individualized gain control of remote uplink paths 46(1)(1)-46(1)(Q)-46(P)(1)-46(P)(Q) in the remote units 34(1)-34(P) based on individual remote unit 34(1)-34(P) contribution to combined uplink power $U_{PC}$ of the combined uplink communications signal 38U in the central unit 36. This is opposed to reducing the remote gain level of remote uplink paths 46(1)(1)-46(1)(Q)-46(P)(1)-46(P)(Q) in the remote units 34(1)-34(P) equally in response to the combined uplink power $U_{PC}$ of the combined uplink communications signal 38U in the central unit 36 being higher than desired or exceeding a desired central uplink power threshold.

Figure 3:
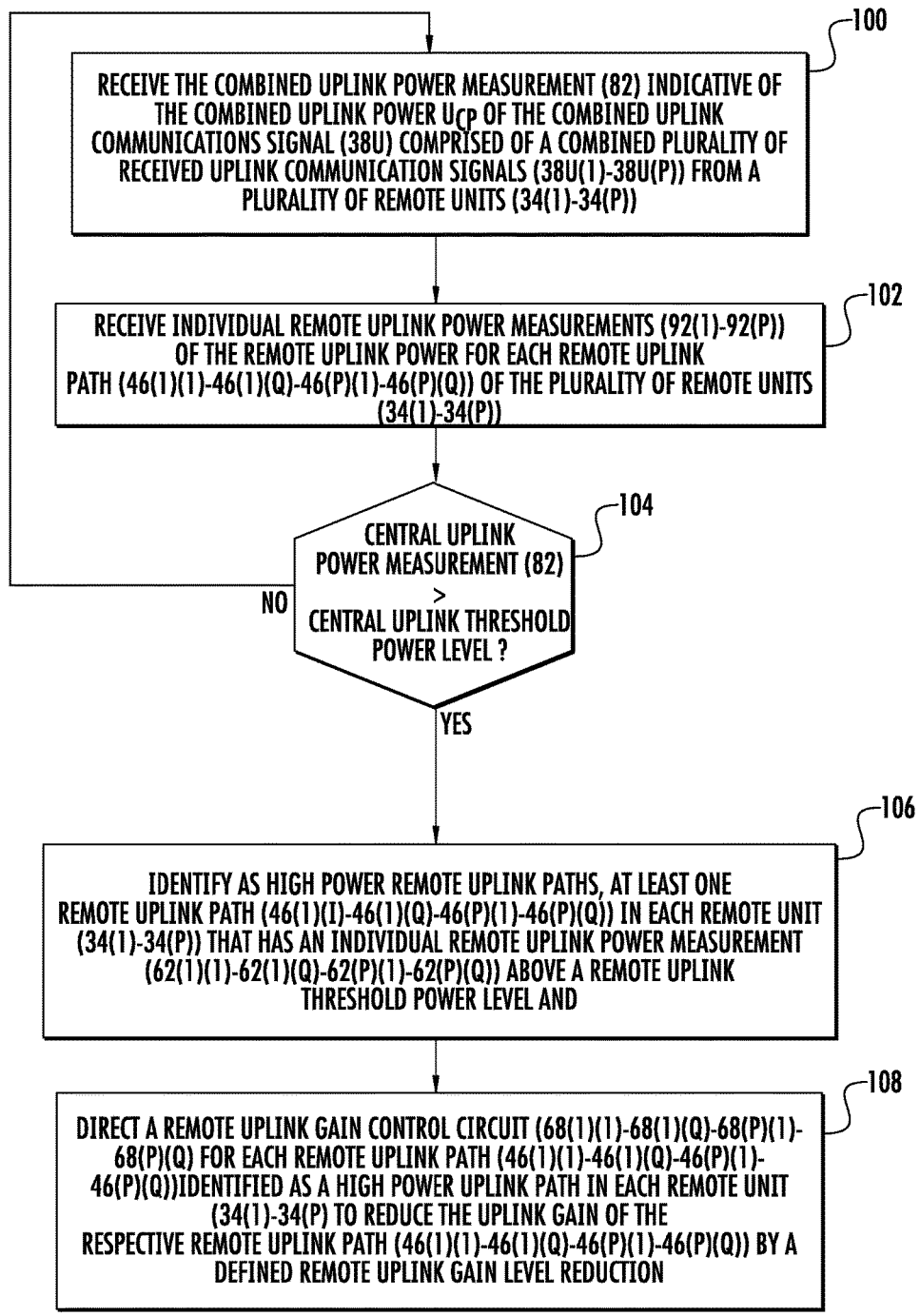
FIG. 3 is a flowchart illustrating an exemplary process of the gain control system in the DAS in FIG. 2 individually controlling the uplink path gain in the remote units based on the individual remote unit contribution to the combined uplink power.
Figure 4:
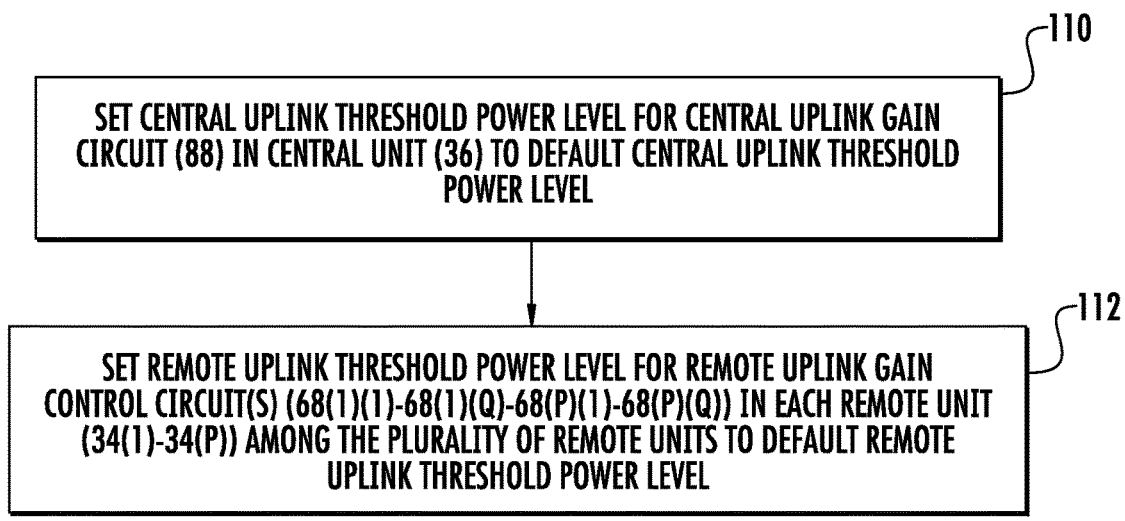
FIG. 4 is a flowchart illustrating an exemplary process of the gain control system in the DAS in FIG. 2 setting a default central uplink threshold power level to be used for gain control of the central uplink path in the central unit and a default remote uplink threshold power level in remote units to be used for individualized gain control of the remote uplink paths in the remote units.

In this regard, in this example DAS 30 in FIG. 2 and as illustrated in the flowchart in FIG. 3, the central controller 84 is configured to receive the central uplink power measurement 82 indicative of the combined uplink power $U_{CP}$ of the combined uplink communications signal 38U on the central uplink path 74 (block 100 in FIG. 3). The central controller 84 is also configured to receive individual remote uplink power measurements 92(1)-92(P) for each remote uplink path 46(1)(1)-46(1)(Q)-46(P)(1)-46(P)(Q) in the remote units 34(1)-34(P) (block 102 in FIG. 3). The central controller 84 is configured to determine if the central uplink power measurement 82 indicative of the combined uplink power $U_{PC}$ of the combined uplink communications signal 38U is greater than a central uplink threshold power level (decision 104 in FIG. 3). For example, the central uplink threshold power level may be set to a default central uplink threshold power level. For example, as illustrated in the flowchart in FIG. 4, the central uplink threshold power level may be set and stored by the central controller 84 as a default central uplink threshold power level during initialization of the DAS 30 or during operation (block 110 in FIG. 4).

With continuing reference back to FIG. 2, if the central uplink power measurement 82 is not greater than the central uplink threshold power level (decision 104 in FIG. 3), the central controller 84 can repeat the process by returning back to block 100 in FIG. 3. However, if the central uplink power measurement 82 is greater than the central uplink threshold power level (decision 104 in FIG. 3), the central controller 84 is further configured to identify as a high power remote uplink paths, those remote uplink paths 46(1)(1)-46(1)(Q)-46(P)(1)-46(P)(Q) in each remote unit 34(1)-34(P) that have an individual remote uplink power measurement 62(1)(1)-62(1)(Q)-62(P)(1)-62(P)(Q) above a respective remote uplink threshold power level configured in the respective remote uplink gain control system 56(1)(1)-56(1)(Q)-56(P)(1)-56(P)(Q) (block 106 in FIG. 3). The high power remote uplink paths may additionally be identified as those remote uplink paths 46(1)(1)-46(1)(Q)-46(P)(1)-46(P)(Q) within a defined power level (e.g. within 10 dB) from the respective remote uplink threshold power level. For example, the remote uplink threshold power levels for the remote uplink paths 46(1)(1)-46(1)(Q)-46(P)(1)-46(P)(Q)

may be set to a single default remote uplink threshold power level used for all remote uplink paths 46(1)(1)-46(1)(Q)-46(P)(1)-46(P)(Q), or to individual default remote uplink threshold power levels specific to each of the remote uplink paths 46(1)(1)-46(1)(Q)-46(P)(1)-46(P)(1)-46(P)(Q). For example, as illustrated in the flowchart in FIG. 4, the remote uplink threshold power level(s) may be set and stored by the remote controllers 64(1)-64(P) as a default remote uplink threshold power level(s) during initialization of the DAS 30 or during operation (block 112 in FIG. 4). The central controller 84 may provide the default remote uplink threshold power level(s) to the remote controllers 64(1)-64(P). In this manner, the remote uplink paths 46(1)(1)-46(1)(Q)-46(P)(1)-46(P)(Q) are identified that can be reduced in remote uplink gain without risking the respective uplink communications signals 38U(1)(1)-38U(1)(Q)-38U (P)(1)-38U(P)(Q) not having sufficient uplink power to reach the central unit 36 and/or base station 40 with sufficient desired power.

With continuing reference back to FIG. 2, the central controller 84 is then configured to send the remote uplink gain control signal 90 to direct any remote uplink gain control circuit 68(1)(1)-68(1)(Q)-68(P)(1)-68(P)(Q) for each remote uplink path 46(1)(1)-46(1)(Q)-46(P)(1)-46(P)(Q) identified as a high power remote uplink paths in each remote unit 34(1)-34(P), to reduce the remote uplink gain of the respective identified high power remote uplink paths 46(1)(1)-46(1)(Q)-46(P)(1)-46(P)(Q) by a defined or calculated remote uplink gain level reduction (block 108 in FIG. 3). As one non-limiting example, the defined remote uplink gain level reduction may be two (2) dB. The defined remote uplink gain level reduction may be set to a programmed value or calculated. In this manner, the gain level of remote uplink paths 46(1)(1)-46(1)(Q)-46(P)(1)-46(P)(Q) in remote units 34(1)-34(P) that provide higher power contributions to the combined uplink power $U_{CP}$ of the combined uplink communications signal 38U can be reduced, without reducing the gain level in remote uplink paths that did not provide higher power contributions to the combined uplink power $U_{CP}$ of the combined uplink communications signal 38U of remote units 34(1)-34(P) and by that not reducing their sensitivity, which mean that their respective received uplink communications signals 38U(1)(1)-38U(1)(Q)-38U(P)(1)-38U(P)(Q) do not reach the central unit 36 with enough power.

Note that central controller 84 may repeat the process in blocks 100-108 in FIG. 3 periodically or during operation of the DAS 30. The process may be repeated, because the uplink communications signals 38U(1)(1)-38U(1)(Q)-38U(P)(1)-38U(P)(Q) received at each remote unit 34(1)-34(P) may continuously change (e.g., new calls are initiated or terminated, subscribers get closer to the DAS antennas or get away from the DAS antennas).

In another embodiment, the central controller 84 is configured to receive individual remote uplink power measurements 92(1)-92(P) for the total remote power in combined remote uplink paths 46(1)-46(P) in the remote units 34(1)-34(P). Thus, the central controller 84 can still identify high power remote uplink paths in each remote unit 34(1)-34(P), to reduce the remote uplink gain of the respective identified high power remote uplink paths. However, in this scenario, the central controller 84 would only be able to identify as high power remote uplink paths, the combined remote uplink paths 46(1)-46(P) for each remote unit 34(1)-34(P) and not individual remote uplink paths 46(1)(1)-46(1)(Q)-46(P)(1)-46(P)(Q) on a frequency band basis.

Figure 5:
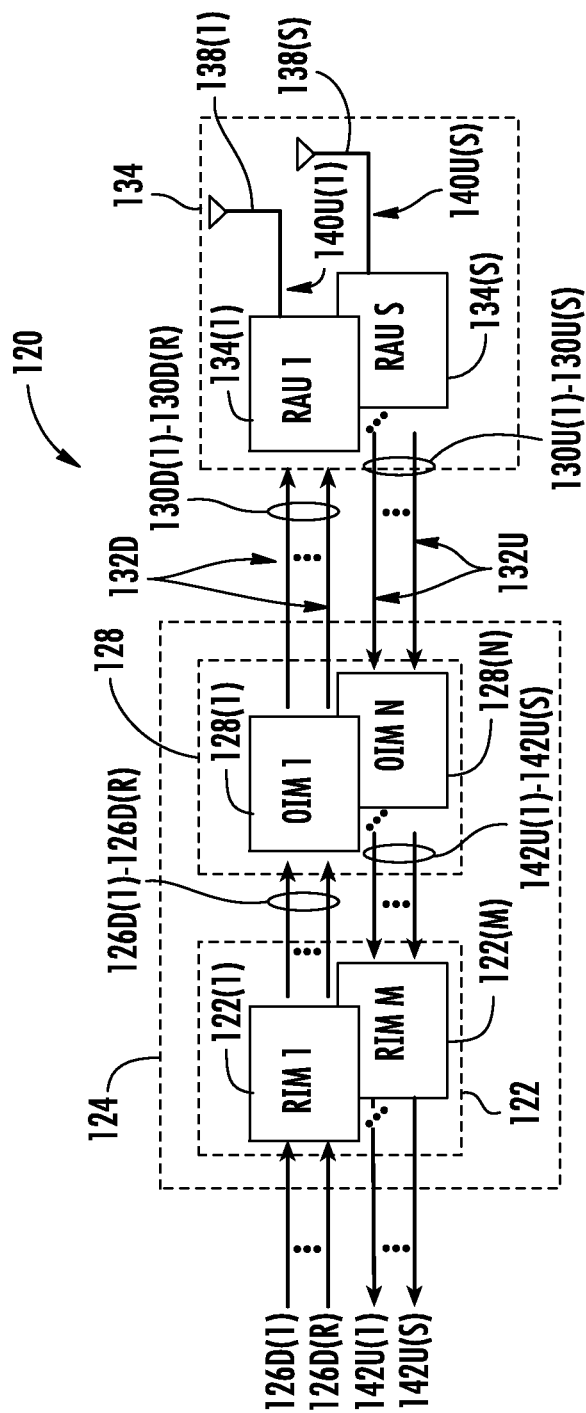
FIG. 5 is a schematic diagram of an exemplary optical fiber-based DAS that can include the gain control system in FIG. 2 to individually control the uplink path gain in the remote units based on the remote unit contribution to the combined uplink power.

The gain control system 32 in the DAS 30 in FIG. 2 can be provided in other DASs as well, without limitation. For example, FIG. 5 is a schematic diagram of another exemplary optical fiber-based DAS 120 that may be employed according to the embodiments disclosed herein to include a gain control system, like the gain control system 32 in FIG. 2, to provide individualized gain control of uplink paths in remote units in a DAS based on individual remote unit contribution to combined uplink power. In this embodiment, the optical fiber-based DAS 120 includes optical fiber for distributing communications services. The optical fiber-based DAS 120 in this embodiment is comprised of three (3) main components. One or more radio interfaces provided in the form of radio interface modules (RIMs) 122(1)-122(M) in this embodiment are provided in a central unit 36 to receive and process downlink electrical communications signals 126D(1)-126D(R) prior to optical conversion into downlink optical communications signals. The RIMs 122(1)-122(M) provide both downlink and uplink interfaces. The notations "1-R" and "1-M" indicate that any number of the referenced component, 1-R and 1-M, respectively, may be provided. The central unit 124 accepts the plurality of RIMs 122(1)-122(M) as modular components that can easily be installed and removed or replaced in the central unit 124. In one embodiment, the central unit 124 is configured to support up to twelve (12) RIMs 122(1)-122(12).

Each RIM 122(1)-122(M) can be designed to support a particular type of radio source or range of radio sources (i.e., frequencies) to provide flexibility in configuring the central unit 124 and the optical fiber-based DAS 120 to support the desired radio sources. For example, one RIM 122 may be configured to support the Personal Communication Services (PCS) radio band. Another RIM 122 may be configured to support the 700 MHz radio band. In this example, by inclusion of these RIMs 122, the central unit 124 could be configured to support and distribute communications signals on both PCS and LTE 700 radio bands, as an example. RIMs 122 may be provided in the central unit 124 that support any frequency bands desired, including but not limited to the US Cellular band, Personal Communication Services (PCS) band, Advanced Wireless Services (AWS) band, 700 MHz band, Global System for Mobile communications (GSM) 900, GSM 1800, and Universal Mobile Telecommunication System (UMTS). The RIMs 122 may also be provided in the central unit 124 that support any wireless technologies desired, including but not limited to Code Division Multiple Access (CDMA), CDMA200, 1×RTT, Evolution-Data Only (EV-DO), UMTS, High-speed Packet Access (HSPA), GSM, General Packet Radio Services (GPRS), Enhanced Data GSM Environment (EDGE), Time Division Multiple Access (TDMA), Long Term Evolution (LTE), iDEN, and Cellular Digital Packet Data (CDPD).

The RIMs 122 may be provided in the central unit 124 that support any frequencies desired, including but not limited to US FCC and Industry Canada frequencies (824-849 MHz on uplink and 869-894 MHz on downlink), US FCC and Industry Canada frequencies (1850-1915 MHz on uplink and 1930-1995 MHz on downlink), US FCC and Industry Canada frequencies (1710-1755 MHz on uplink and 2110-2155 MHz on downlink), US FCC frequencies (698-716 MHz and 776-787 MHz on uplink and 728-746 MHz on downlink), EU R & TTE frequencies (880-915 MHz on uplink and 925-960 MHz on downlink), EU R & TTE frequencies (1710-1785 MHz on uplink and 1805-1880 MHz on downlink), EU R & TTE frequencies (1920-1980 MHz on uplink and 2110-2170 MHz on downlink), US FCC frequencies (806-824 MHz on uplink and 851-869 MHz on downlink), US FCC frequencies (896-901 MHz on uplink and 929-941 MHz on downlink), US FCC frequencies (793-805 MHz on uplink and 763-775 MHz on downlink), and US FCC frequencies (2495-2690 MHz on uplink and downlink).

The downlink electrical communications signals 126D(1)-126D(R) are provided to a plurality of optical interfaces provided in the form of optical interface modules (OIMs) 128(1)-128(N) in this embodiment to convert the downlink electrical communications signals 126D(1)-126D(R) into downlink optical communications signals 130D(1)-130D(R). The notation "1-N" indicates that any number of the referenced component 1-N may be provided. The OIMs 128 may be configured to provide one or more optical interface components (OICs) that contain optical to electrical (O/E) and electrical to optical (E/O) converters, as will be described in more detail below. The OIMs 128 support the radio bands that can be provided by the RIMs 122, including the examples previously described above. Thus, in this embodiment, the OIMs 128 may support a radio band range from 400 MHz to 2700 MHz.

The OIMs 128(1)-128(N) each include E/O converters to convert the downlink electrical communications signals 126D(1)-126D(R) into the downlink optical communications signals 130D(1)-130D(R). The downlink optical communications signals 130D(1)-130D(R) are communicated over downlink optical fiber(s) communications medium 132D to a plurality of remote antenna units 134(1)-134(S). The notation "1-P" indicates that any number of the referenced component 1-P may be provided. O/E converters provided in the remote antenna units 134(1)-134(S) convert the downlink optical communications signals 130D(1)-130D(R) back into the downlink electrical communications signals 126D(1)-126D(R), which are provided to antennas 138(1)-138(S) in the remote antenna units 134(1)-134(S) to client devices in the reception range of the antennas 138(1)-138(S).

E/O converters are also provided in the remote antenna units 134(1)-134(S) to convert uplink electrical communications signals 140U(1)-140U(S) received from client devices through the antennas 138(1)-138(S) into uplink optical communications signals 130U(1)-130U(S) to be communicated over an uplink optical fiber communications medium 132U to the OIMs 128(1)-128(N). The OIMs 128(1)-128(N) include O/E converters that convert the uplink optical communications signals 130U(1)-130U(S) into uplink electrical communications signals 142U(1)-142U(S) that are processed by the RIMs 122(1)-122(M) and provided as uplink electrical communications signals 142U(1)-142U(S). Note that the downlink optical fiber communications medium 132D and uplink optical fiber communications medium 132U connected to each remote antenna unit 134(1)-134(S) may be a common optical fiber communications medium, wherein for example, wave division multiplexing (WDM) may be employed to provide the downlink optical communications signals 130D(1)-130D(S) and the uplink optical communications signals 130U(1)-130U(S) on the same optical fiber communications medium.

Figure 6:
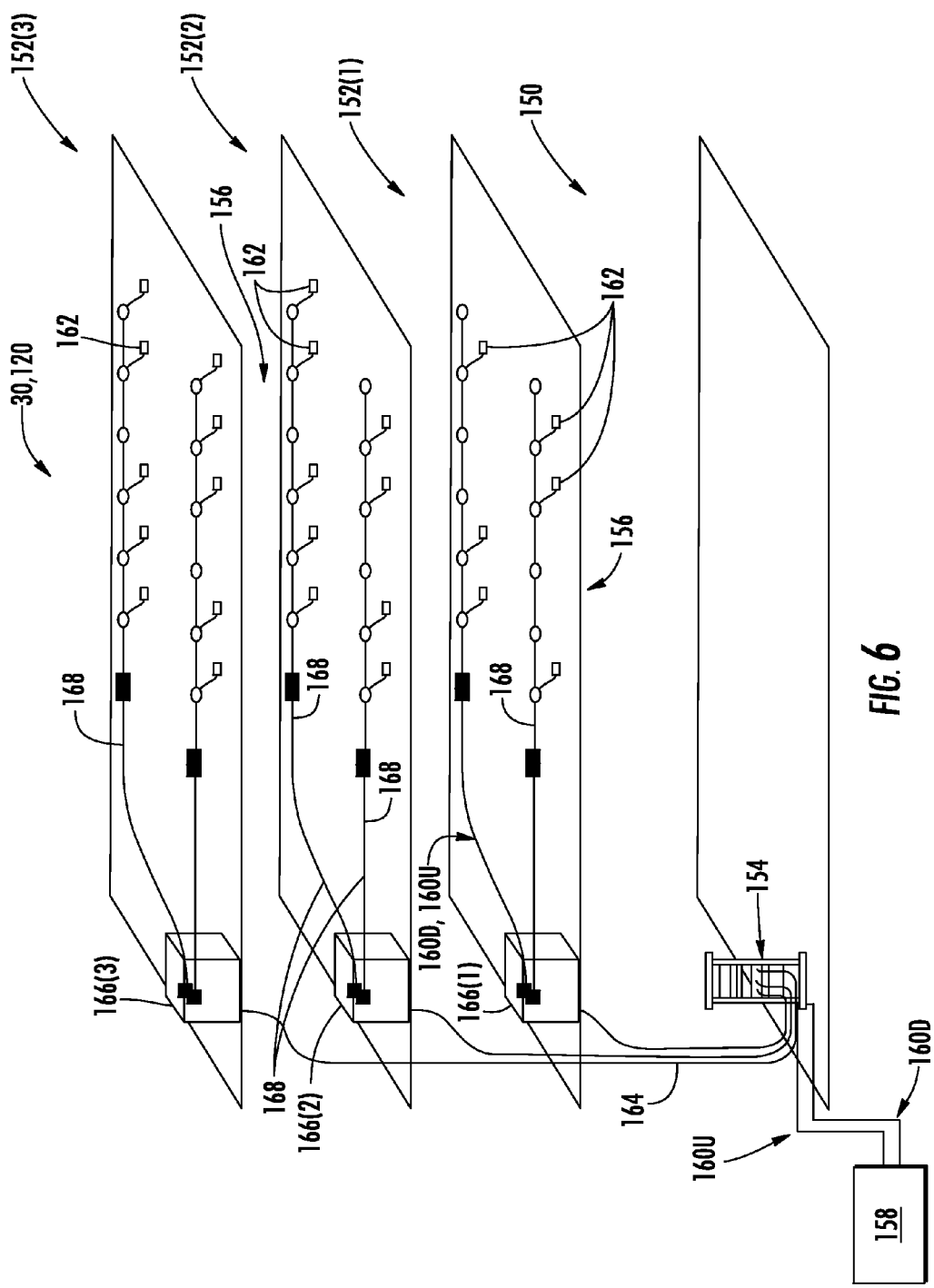
FIG. 6 is a partially schematic cut-away diagram of an exemplary building infrastructure in which the DAS in FIG. 5 can be employed.

The DAS 120 in FIG. 5 may also be provided in an indoor environment, as illustrated in FIG. 6. FIG. 6 is a partially schematic cut-away diagram of a building infrastructure 150 employing the DASs 30, 120 described herein. The building infrastructure 150 in this embodiment includes a first (ground) floor 152(1), a second floor 152(2), and a third floor 152(3). The floors 152(1)-152(3) are serviced by the central unit 154 to provide the antenna coverage areas 156 in the building infrastructure 150. The central unit 154 is communicatively coupled to the base station 158 to receive downlink communications signals 160D from the base station 158. The central unit 154 is communicatively coupled to the remote antenna units 162 to receive the uplink communications signals 160U from the remote antenna units 162, as previously discussed above. The downlink and uplink communications signals 160D, 160U communicated between the central unit 154 and the remote antenna units 162 are carried over a riser cable 164. The riser cable 164 may be routed through interconnect units (ICUs) 166(1)-166(3) dedicated to each floor 152(1)-152(3) that route the downlink and uplink communications signals 160D, 160U to the remote units 162 and also provide power to the remote units 162 via array cables 168.

Figure 7:
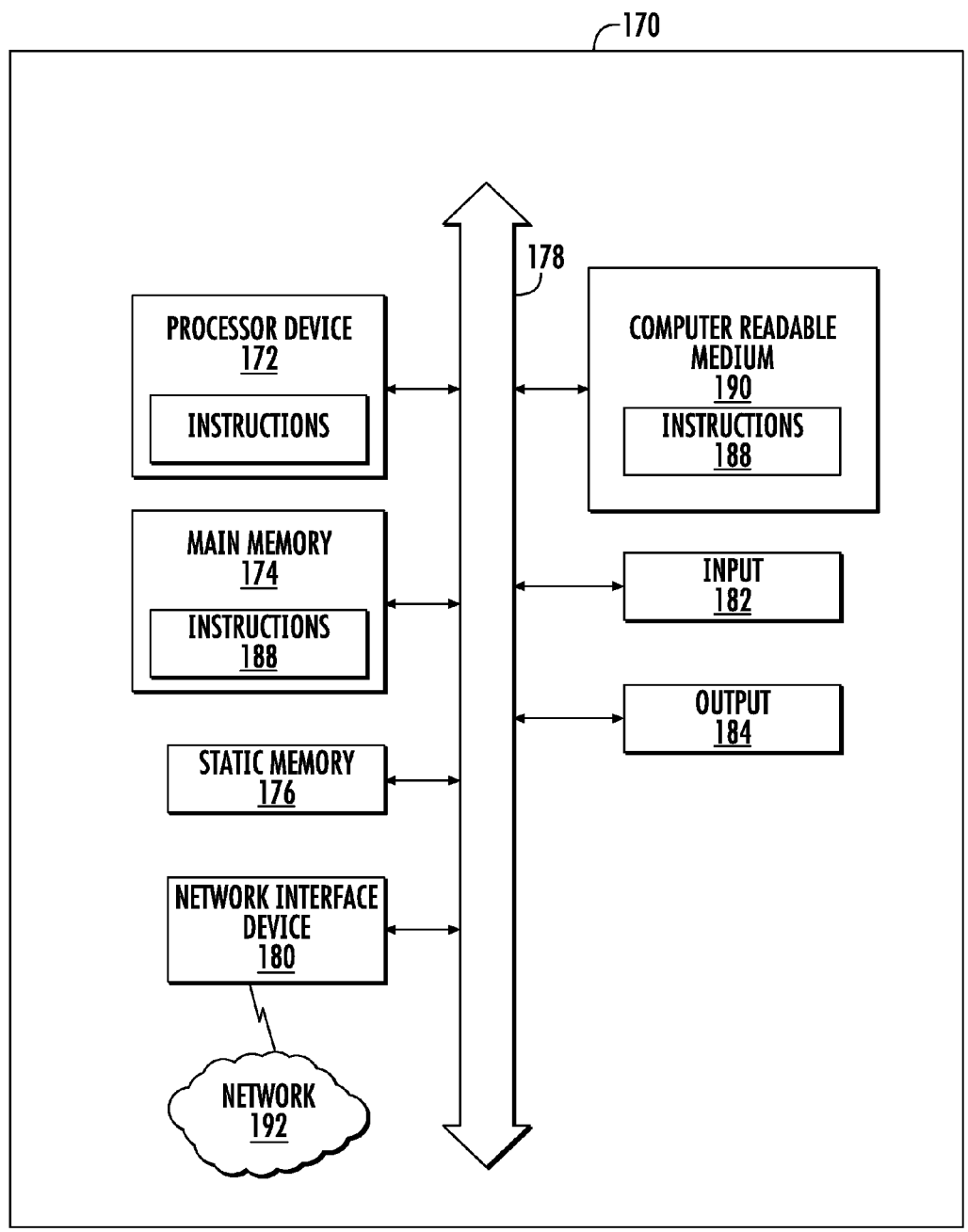
FIG. 7 is a schematic diagram of a generalized representation of an exemplary controller that can be included in any central unit, remote units, wireless client devices, and/or any other components of a DAS.

FIG. 7 is a schematic diagram representation of additional detail illustrating a computer system 170 that could be employed in any controllers disclosed herein, including the central controller 84 and the remote controllers 64(1)-64(P) in the DAS 30 in FIG. 2. The control system 170 is adapted to execute instructions from an exemplary computer-readable medium to perform these and/or any of the functions or processing described herein.

In this regard, the computer system 170 in FIG. 7 may include a set of instructions that may be executed to calculate gain of DAS segment in a DAS. The computer system 170 may be connected (e.g., networked) to other machines in a LAN, an intranet, an extranet, or the Internet. While only a single device is illustrated, the term "device" shall also be taken to include any collection of devices that individually or jointly execute a set (or multiple sets) of instructions to perform any one or more of the methodologies discussed herein. The computer system 170 may be a circuit or circuits included in an electronic board card, such as, a printed circuit board (PCB), a server, a personal computer, a desktop computer, a laptop computer, a personal digital assistant (PDA), a computing pad, a mobile device, or any other device, and may represent, for example, a server or a user's computer.

The exemplary computer system 170 in this embodiment includes a processing device or processor 172, a main memory 174 (e.g., read-only memory (ROM), flash memory, dynamic random access memory (DRAM), such as synchronous DRAM (SDRAM), etc.), and a static memory 176 (e.g., flash memory, static random access memory (SRAM), etc.), which may communicate with each other via a data bus 178. Alternatively, the processor 172 may be connected to the main memory 174 and/or static memory 176 directly or via some other connectivity means. The processor 172 may be a controller, and the main memory 174 or static memory 176 may be any type of memory.

The processor 172 represents one or more general-purpose processing devices, such as a microprocessor, central processing unit, or the like. More particularly, the processor 172 may be a complex instruction set computing (CISC) microprocessor, a reduced instruction set computing (RISC) microprocessor, a very long instruction word (VLIW) microprocessor, a processor implementing other instruction sets, or other processors implementing a combination of instruction sets. The processor 172 is configured to execute processing logic in instructions for performing the operations and steps discussed herein.

The computer system 170 may further include a network interface device 180. The computer system 170 also may or may not include an input 182, configured to receive input and selections to be communicated to the computer system 170 when executing instructions. The computer system 170 also may or may not include an output 184, including but not limited to a display, an alphanumeric input device, and/or a cursor control device.

The computer system 170 may include a data storage device that includes instructions 188 stored in a computer-readable medium 190. The instructions 188 may also reside, completely or at least partially, within the main memory 174 and/or within the processor 172 during execution thereof by the computer system 170, the main memory 174 and the processor 172 also constituting computer-readable medium.

While the medium 190 is shown to be a single medium, the term "computer-readable medium" shall include a single medium or multiple media (e.g., a centralized or distributed database, and/or associated caches and servers) that store the one or more sets of instructions. The term "computer-readable medium" shall include any medium that is capable of storing, encoding, or carrying a set of instructions for execution by the processing device and that cause the processing device to perform any one or more of the methodologies of the embodiments disclosed herein.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.); and the like.

Unless specifically stated otherwise and as apparent from the previous discussion, it is appreciated that throughout the description, discussions utilizing terms such as "processing," "computing," "determining," "displaying," or the like, refer to the action and processes of a computer system, or similar electronic computing device, that manipulates and transforms data and memories represented as physical (electronic) quantities within the computer system's registers into other data similarly represented as physical quantities within the computer system memories or registers or other such information storage, transmission, or display devices.

The algorithms and displays presented herein are not inherently related to any particular computer or other apparatus. Various systems may be used with programs in accordance with the teachings herein, or it may prove convenient to construct more specialized apparatuses to perform the required method steps. The required structure for a variety of these systems will appear from the description above. In addition, the embodiments described herein are not described with reference to any particular programming language. It will be appreciated that a variety of programming languages may be used to implement the teachings of the embodiments as described herein.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The components of the distributed antenna systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends on the particular application, design choices, and/or design constraints imposed on the overall system.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA), or other programmable logic device, a discrete gate or transistor logic, discrete hardware components, or any combination thereof designed to perform the functions described herein. Furthermore, a controller may be a processor. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The embodiments disclosed herein may be embodied in hardware and in instructions that are stored in hardware, and may reside, for example, in RAM, flash memory, ROM, Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

The operational steps described herein may be performed in numerous different sequences other than the illustrated sequences. Furthermore, operations described in a single operational step may actually be performed in a number of different steps. Additionally, one or more operational steps discussed in the exemplary embodiments may be combined. Those of skill in the art will also understand that information and signals may be represented using any of a variety of technologies and techniques. For example, data, instructions, commands, information, signals, bits, symbols, and chips, that may be references throughout the above description, may be represented by voltages, currents, electromagnetic waves, magnetic fields, or particles, optical fields or particles, or any combination thereof.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

Various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A central gain control system for providing individualized gain control of at least one uplink path in remote units in a distributed antenna system (DAS) based on an individual remote unit contribution to a combined uplink power, comprising:
   a central uplink power measurement circuit coupled to a central uplink path in a central unit carrying a combined uplink communications signal comprised of a combined plurality of received uplink communications signals from a plurality of remote units, the central uplink power measurement circuit configured to:
     measure a combined uplink power of the combined uplink communications signal; and
     provide a combined uplink power measurement indicative of the combined uplink power of the combined uplink communications signal; and
   a central controller configured to:
     (a) receive the combined uplink power measurement indicative of the combined uplink power of the combined uplink communications signal;
     (b) receive individual remote uplink power measurements of a remote uplink power for each remote uplink path of the plurality of remote units; and
     (c) determine if the combined uplink power measurement is greater than a central uplink threshold power level;
     (d) if the combined uplink power measurement is greater than the central uplink threshold power level:
       identify as a high power remote uplink path, at least one remote uplink path in at least one remote unit among the plurality of remote units that has an individual remote uplink power measurement above a remote uplink threshold power level; and
       direct a remote uplink gain control circuit for at least one remote uplink path identified as a high power remote uplink path in at least one remote unit among the plurality of remote units, to reduce the uplink gain of the respective remote uplink path by a defined remote uplink gain level reduction.

2. The central gain control system of claim 1, further comprising the central controller repeatedly performing tasks (a)-(d).

3. The central gain control system of claim 2, wherein each remote uplink path is associated with one or more communications frequency bands, each communication frequency band among the one or more communications frequency bands supporting one or more communications services.

4. The central gain control system of claim 2, wherein the central uplink power measurement circuit comprises a combined uplink power detector configured to measure the combined uplink power of the combined uplink communications signal.

5. The central gain control system of claim 2, wherein if the combined uplink power measurement is greater than a central uplink threshold power level, the central controller is configured to:
   identify as the high power remote uplink paths, a plurality of remote uplink paths in each remote unit among the plurality of remote units that have the individual remote uplink power measurement above the remote uplink threshold power level; and
   direct the remote uplink gain control circuit for each remote uplink path among the plurality of remote uplink paths identified as a high power remote uplink path in each remote unit among the plurality of remote units, to reduce the uplink gain of the respective remote uplink path by a defined remote uplink gain level reduction.

6. The central gain control system of claim 1, further comprising a central uplink gain control circuit disposed in the central uplink path in the central unit;
   wherein the central controller is further configured to:
     determine if the combined uplink power measurement is different that a central uplink threshold power level; and
     if the combined uplink power measurement is different that the central uplink threshold power level, send a combined uplink gain adjustment signal to the central uplink gain control circuit to adjust a combined uplink gain level of the central uplink path; and
   the central uplink gain control circuit is configured to adjust the combined uplink gain of the central uplink path based on the combined uplink gain adjustment signal.

7. The central gain control system of claim 6, wherein the central uplink power measurement circuit and the central uplink gain control circuit are provided in a central uplink gain control system.

8. The central gain control system of claim 6, wherein the central uplink gain control circuit comprises a central uplink automatic level control (ALC) circuit further configured to limit a combined uplink power level of the central uplink path based on the combined uplink gain adjustment signal;
   wherein the central controller is configured to:
     determine if the combined uplink power measurement is different that a central uplink threshold power level by being configured to determine if the combined uplink power measurement exceeds the central uplink threshold power level; and
     if the combined uplink power measurement exceeds the central uplink threshold power level, send a combined uplink gain adjustment signal to the central uplink gain control circuit to attenuate the combined uplink power of the central uplink path.

9. The central gain control system of claim 6, wherein the central uplink gain control circuit comprises a central uplink automatic gain control (AGC) circuit configured to adjust the combined uplink gain of the central uplink path based on the combined uplink gain adjustment signal.

10. The central gain control system of claim 9, wherein the central controller is further configured to set the central uplink threshold power level to a default central uplink threshold power level.

11. A method of providing individualized gain control of uplink paths in remote units in a distributed antenna system (DAS) based on individual remote unit contribution to a combined uplink power, comprising:
   (a) measuring a combined uplink power of combined uplink communications signal comprised of a combined plurality of uplink communications signals received from a plurality of remote units;

(b) providing a combined uplink power measurement indicative of the combined uplink power of the combined uplink communications signal;

(c) receiving individual remote uplink power measurements of a remote uplink power for each remote uplink path of the plurality of remote units;

(d) determining if the combined uplink power measurement is greater than a central uplink threshold power level; and (e) if the combined uplink power measurement is greater than a central uplink threshold power level:
identifying as a high power remote uplink path, all remote uplink paths in at least one remote unit among the plurality of remote units that have an individual remote uplink power measurement above a remote uplink threshold power level; and
directing a remote uplink gain control circuit for the remote uplink path identified as a high power remote uplink path in each remote unit among the plurality of remote units, to reduce the uplink gain of the respective remote uplink path by a defined remote uplink gain level reduction.

12. The method of claim 11, further comprising repeatedly performing tasks (a)-(e).

13. The method of claim 12, further comprising setting the remote uplink threshold power level for each remote unit among the plurality of remote units to a default remote uplink threshold power level.

14. The method of claim 13, wherein setting the remote uplink threshold power level for each remote unit among the plurality of remote units comprises directing the remote uplink gain control circuit in each remote unit among the plurality of remote units to set their remote uplink threshold power level to a default remote uplink threshold power level.

15. The method of claim 13, wherein setting the remote uplink threshold power level for each remote unit among the plurality of remote units comprises setting the remote uplink threshold power level for each remote unit among the plurality of remote units to a specific default remote uplink threshold power level specific for each remote unit among the plurality of remote units.

16. The method of claim 15, further comprising:
determining if the combined uplink power measurement is different that a central uplink threshold power level; and
if the combined uplink power measurement is different that the central uplink threshold power level:
sending a combined uplink gain adjustment signal to a central uplink gain control circuit to adjust a combined uplink gain of a central uplink path; and
adjusting the combined uplink gain of the central uplink path based on the combined uplink gain adjustment signal.

17. The method of claim 16, wherein adjusting the combined uplink gain of the central uplink path comprises automatic gain limiting the combined uplink gain of the central uplink path based on the combined uplink gain adjustment signal.

18. The method of claim 16, wherein adjusting the combined uplink gain of the central uplink path comprises automatic gain controlling the combined uplink gain of the central uplink path based on the combined uplink gain adjustment signal.

19. The method of claim 16, further comprising setting the central uplink threshold power level to a default central uplink threshold power level.

20. The central gain control system of claim 3, wherein each communication frequency band supports one or more different communications services.

* * * * *